US006594034B1

United States Patent
Bloomquist et al.

(10) Patent No.: US 6,594,034 B1
(45) Date of Patent: *Jul. 15, 2003

(54) METHOD AND APPARATUS FOR MODIFYING RASTER DATA

(75) Inventors: Donna R. Bloomquist, Salem, MA (US); Alan Pincus, Newton Center, MA (US); Jeremy C. Catt, North Andover, MA (US)

(73) Assignee: Agfa Corporation, Wilmington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/498,534

(22) Filed: Feb. 4, 2000

Related U.S. Application Data

(63) Continuation-in-part of application No. 09/089,861, filed on Jun. 3, 1998.
(60) Provisional application No. 60/048,603, filed on Jun. 4, 1997.

(51) Int. Cl.[7] .............................................. G06K 15/02
(52) U.S. Cl. ...................................... 358/1.18; 358/450
(58) Field of Search ................................ 358/1.18, 450

(56) References Cited

U.S. PATENT DOCUMENTS

| | | | | |
|---|---|---|---|---|
| 4,395,116 A | * | 7/1983 | Patton et al. ................... 355/32 |
| 4,531,120 A | | 7/1985 | Brownell, Jr. et al. |
| 5,687,332 A | | 11/1997 | Kurahashi et al. |
| 5,715,382 A | | 2/1998 | Herregods et al. |
| 5,983,243 A | * | 11/1999 | Heiney et al. ............... 707/500 |

* cited by examiner

Primary Examiner—Edward Coles
Assistant Examiner—Alan Rahimi
(74) Attorney, Agent, or Firm—Ira Heffan; Mark L. Beloborodov; Robert A. Sabourin

(57) ABSTRACT

A print drive that is placed in a prepress workflow between a raster image processor and an output device receives first and second raster data corresponding to first and second image data, and processed by the raster image processor. The print drive uses the second raster data to modify the first raster data. In one embodiment, the first raster data is digitally combined with the second raster data using a digital doubleburner. In another embodiment, a digital masker uses the second raster data as a mask to selectively delete a portion of the first raster data. When used in succession, the digital masker and the digital doubleburner permit the editing of raster data which is rendered through the output device as a modified printed image.

30 Claims, 23 Drawing Sheets

METHOD AND APPARATUS FOR MODIFYING RASTER DATA

This application is a continuation-in-part of U.S. patent application Ser. No. 09/089,861 filed on Jun. 3, 1998 which, in turn, claims the benefit of U.S. Provisional Patent Application No. 60/048,603 filed on Jun. 4, 1997.

TECHNICAL FIELD

The invention relates to electronic prepress and imagesetting systems. More particularly, the invention relates to a method and apparatus for digitally modifying raster data, defined as image data which has been processed by a raster image processor.

BACKGROUND INFORMATION

Printing presses use plates to print ink onto paper and other media. One method used for creating plates has been to expose photosensitive film with the matter to be printed. When the film is developed, the matter imaged on the film is imaged onto a photosensitive plate, sometimes referred to as "burning" a plate. After processing, the plate can be used to print the matter onto a medium.

In a black and white printing job, there is usually one plate that is used to print black ink. In a color printing job, a different plate is used for each color ink. Typically, a color job will use three colors of ink: cyan, magenta, and yellow. This is because a combination of cyan, magenta, and yellow can be used to make other colors. A plate is produced for each color ink. Often, in addition to cyan, magenta, and yellow, black ink is also used. An additional plate is then required to print the black ink. Occasionally, one or more colors will be printed separately as well, referred to as a "spot color." That color will also have its own plate.

Electronic prepress systems have used an imagesetter to receive raster data for imaging onto photosensitive film. The film is then used to create a plate. The imagesetter exposes the photosensitive film pixel by pixel, for instance, by scanning a laser across and down a piece of film. Electronics controls the laser to expose, or refrain from exposing, each pixel in the raster data in a precise and repeatable manner. Recently, platesetters also have been used to create plates directly from raster data without the use of film. Imagesetters, platesetters and other output devices for printing are generally referred to as print engines.

Print engines typically have been served by a dedicated raster image processor (RIP) connected between the print engine and a "front end" computer running imaging application software such as Quark Express™ and Adobe Pagemaker™,. Exemplary front end computers run on operating systems such as Windows NT™. MacOS™ and UNIX™. In a typical configuration, a Macintosh™ front end is connected to a RIP which is coupled with an imagesetter. The RIP interprets the graphic information transmitted to it by the front end computer, and converts the graphic information into raster data that can be imaged by the print engine. The raster data produced by the RIP is configured to match required parameters of both the imagesetter and the media. The imagesetter parameters include imaging resolution, processing speed and specific printing capabilities. The media parameters include the length, width and thickness of the media, as well as the chemical makeup of the photosensitive layer.

Typically, the imaging application software provides output in the format of a page description language (PDL) such as Postscript™ and PDF™ offered by Adobe Systems of Mountain View, Calif. Page description languages describe images using descriptions of the objects contained in the page. Use of page description languages allows pages to be described in a way that can be interpreted appropriately for imaging at various sizes and resolutions. PDL code is generally significantly smaller in data size than the raster data that results from interpreting the PDL code. Use of a page description language therefore allows for faster file transfer. Also, page description languages are machine-independent so that any print engine or other device which understands the PDL can produce an image therefrom.

When PDL image data is received by the RIP, operations performed by the RIP, such as using fonts to lay out text and color processing to create raster data for each color, typically results in one or more raster data bit maps. The raster data produced by the RIP is binary, meaning that each pixel is either on or off. The raster data for each of the colors in a color image is referred to as a color separation.

Each color separation is transferred from the RIP to the output device over a high speed interface. This has historically been a parallel data transfer interface that provides a data transfer rate sufficient to keep the output device operating at a desired operating speed. Typically, the process of RIP processing data to prepare bit map image files for transfer to the output device has been slower than the imaging speed of the output devices. The slower RIP processing speed sometimes causes the output device to remain idle while waiting for a RIP to prepare the next bit map image file. The print engine is generally an expensive capital investment, so full time utilization of the print engine is desirable. Keeping the print engine busy is therefore a goal of modem electronic prepress system design.

The use of a RIP multiplexer (MUX), for example the MULTISTAR® offered by Agfa Division of Bayer Corporation of Wilmington, Massachusetts, offers the electronic prepress industry some improvement in data throughput, and associated cost savings, by functioning as a data buffer between one or more RIPs and a print engine. Cost savings and improved efficiency have been realized by either RIP processing an image with a first RIP while transferring a previously RIP processed image to the output device or by storing RIP processed raster data for transfer to the output device at an appropriate time after RIP processing. This multiplexer more fully utilizes the output device, and therefore provides increased throughput.

Typically, for prior art electronic prepress systems, a specific output device configuration had to be connected to the RIP before a job could be processed. For example, a print job requiring that a particular type of imagesetter be used for an output device, or that a particular media type or size be loaded onto the output device, could not be RIP processed into raster data if the particular output device connected to the RIP did not meet the job requirements. Improper output device configuration caused delay or, more frequently, required that a user take some action to physically change the output device connected to the RIP in order to continue processing and outputting image files. Since the electronic and imagesetting systems of the prior art were not only device dependent but media dependent as well, the queuing of rasterized print jobs for different media or output devices was not possible. Thus, the choice of the output device and print media proved to be a considerable hindrance in productivity.

RIP processing speed has improved so that the RIP is no longer a bottleneck in the prepress workflow of single page printing jobs. As RIP processing speed has increased, however, so has the demands of output devices. Recent use of larger format imagesetters and platesetters allows multi-page press size images in film or plate, referred to as "flats," to be produced that contain four, eight, or more pages in each image. These output devices also have been driven by a dedicated RIP or MUX. Because multi-page flats are complex, the RIP is often a bottleneck in creating these multi-page press format films and plates. The PDL code that must be interpreted to image multiple page flats is very complex. RIP processing time for complex images can require several multiples of the imaging time.

RIP processing time has a greater impact on workflow when a change is required in a complex image. This is because a change in even a part of one page of a multi-page flat generally requires that the entire image be reprocessed by the RIP. The bottleneck of slow RIP speeds for complex images affects the workflow both the first time the flat is processed by the RIP and the second time when a modified version of the image is processed.

One alternative to reprocessing the entire image, when a modification to a RIP processed image is desired, is to physically modify a film that is output by an imagesetter to make a plate. To accomplish this modification, a portion of the image to be modified is physically cut from the film, and if necessary, a correction film is inserted in its place. This can be difficult to accomplish without imaging artifacts. More importantly, this alternative is not possible with direct-to-plate, i.e. computer-to-plate, technology.

Another technique to modify images once they have been processed by the RIP is known as doubleburning. To conventionally doublebum an image onto a plate is to create two pieces of film and create the plate from both of the images. In other words, the photosensitive plate is physically exposed to two pieces of film, and the resulting plate includes the images from both pieces of film. This is particularly useful for producing composite images where one part of the image has several possible versions. An example of such a composite image contains graphics and text, with different versions of text to be imaged with the same graphics. It can be time consuming to reprocess the complex graphics with each of the variations of text. One technique to reduce RIP processing time is to image graphics once onto a film, leaving a blank space where the particular variation of text is to be inserted into the image, then imaging the text separately onto a second film, without the need to again image the graphics. A plate having both the graphics and one version of the text is produced by burning the plate twice, once with the film containing only the graphics, and once with the film containing only the text. This doubleburning technique is unavailable in direct-to-plate technology since film is not used in the direct-to-plate process of making plates.

SUMMARY OF THE INVENTION

The invention relates to a print drive-which is electronically connected between one or more raster image processors and one or more destination devices. The print drive receives, stores, and transmits raster data of an image processed by the RIP. In one embodiment, the print drive combines raster data of two separate images with a digital doubleburner. In another embodiment, the print drive masks a section of raster data by using masked raster data to delineate the area to be masked. In yet another embodiment, the print drive modifies first raster data by masking the first raster data with masked raster data and then combining the first raster data with the masked first raster data. In each case, the raster data from two separate images is combined with a digital image combiner, i.e. a doubleburner or a mask or a combination of the two.

In general, the invention relates to a method for imaging. The method includes receiving first raster data of a first image processed by a first RIP, and second raster data of a second image processed by a second RIP. Actually the first and second raster data can be processed by the same RIP, or by separate RIPs as desired. The first and second raster data are combined to form combined raster data representing a resultant image.

In one embodiment the method includes the step of receiving, from a second raster image processor, second raster data of a second image which represents a modification to the first image, and mask raster data of the second image which represents a mask of the modification to the first image. The method also includes digitally masking the first raster data with the mask raster data to form masked first raster data. Finally, the method includes digitally combining the masked first raster data and the second raster data to form modified raster data representing a resultant image.

In one embodiment, the first RIP and the second RIP are the same RIP. In another embodiment, the first and second images are each either a color image or a greyscale image. In another embodiment, the method further includes rendering the raster data to a destination device, such as: a platesetter for rendering a resultant image onto a printing plate; an imagesetter for rendering a resultant image onto photosensitive paper, film or other media; a printer for rendering a resultant image onto paper or other print media; a memory for storing the raster data in a file or buffer; or any other known device or application capable of receiving raster data. In another embodiment, the RIPs are page description language interpreters.

In another embodiment, the method further includes creating a first image file coded in a page description language, transmitting the image file to a first RIP which then interprets the first image file to produce the first raster data, and thereafter transmits the first raster data to an output device. The method also includes creating a second image file coded in a second page description language, transmitting the image file to a second RIP which produces the second raster data, and thereafter transmitting the second raster data to an output device. In another embodiment, the method also includes receiving the first image file by a first image server, storing in the first image server the first image file, and transmitting by the first image server to the first RIP the first image file. The method also includes receiving the second image file by a second image server, storing in the second image server the second image file, and transmitting by the second image server to the second RIP the second image file.

In general, in another aspect, the invention features a print drive system including a print drive. The print drive includes a print drive input terminal receiving first raster data of a first image processed by a first RIP, and a second raster data of a second image processed by a second RIP. A digital doubleburner is electrically coupled to the print drive input terminal. The digital doubleburner digitally combines the first raster data and the second raster data to form combined raster data of a resultant image.

In one embodiment, the print drive receives second raster data and mask raster data of a second image processed by a second raster image processor. The print drive also includes a digital masker in electrical communication with the print drive input terminal. The digital masker digitally masks the first raster data with the mask raster data to form masked first raster data. The digital doubleburner combines the masked first raster data and the second raster data to form modified raster data of a resultant image.

In another embodiment, the print drive system includes a graphics imaging system in electrical communication with the print drive input terminal. The graphics imaging system includes a general purpose computer having imaging software for producing first and second image files coded in PDL. The graphics imaging system also includes a RIP in electrical communication with the general purpose computer. The RIP includes a raster image processor receiver for receiving the first image file and the second image file. The RIP also includes an interpreter in electrical communication with the raster image processor receiver for interpreting the first image file and the second image file. The interpreter produces first raster data and second raster data. The RIP also includes a raster image processor output in electrical communication with the interpreter for transmitting the first raster data and the second raster data.

In another embodiment, the graphics imaging system includes an image server in electrical communication with the general purpose computer and the raster image processor. The image server includes an image server receiver for receiving from the general purpose computer the first image file and the second image file. The image server also includes an image server data store in electrical communication with the image server receiver. The image server data store stores the first image file and the second image file. The image server also includes an image server transmitter in electrical communication with the image server data store. The image server transmitter transmits to the RIP the first image file and the second image file.

In general, in another aspect, the invention features an imaging system. The imaging system includes an image generator creating a first image and a second image. The imaging system also includes a raster image processor in electrical communication with the image generator. The raster image processor processes the first image to create first raster data and processes the second image to create second raster data. The imaging system also includes a print drive in electrical communication with the raster image processor. The print drive digitally combines the first raster data and the second raster data to form combined raster data of a resultant image. In another embodiment, the imaging system also includes a destination device in electrical communication with the print drive. In another embodiment, the print drive masks the first raster data with the mask raster data and digitally combines the masked first raster data and the second raster data to form modified raster data of the resultant image. In another embodiment, the print drive masks the first raster data with the mask raster data. The print drive digitally combines the masked first raster data and the second raster data to form modified raster data of the resultant image.

In another aspect, the invention relates to a method for creating a modification for an original image. The method includes creating a modification image having a modification layer for correcting the original image and a mask layer for masking an area of the original image. The method requires accurate positioning between the layers. The method also includes processing the modification image to produce modification raster data and mask raster data. In one embodiment the method includes, prior to the step of creating a modification image, the steps of creating an original image, positioning the original image, and processing the original image to produce original raster data. In another embodiment, the method includes masking the original raster data with the mask raster data to substantially clear the modified area thereby forming masked first raster data. The method also includes digitally combining the masked first raster data with the modification raster data thereby creating modified raster data of the resultant image. In another embodiment, the method includes rendering the modified raster data to a destination device. The destination device is any known device or application for receiving raster data, such as: a platesetter for imaging onto a printing plate; an imagesetter for imaging onto photosensitive paper, film or other media; a printer for printing onto paper or other media; or a memory for storing the raster data in a file or buffer. In another embodiment, the mask layer comprises a substantially 100% fill mask.

The foregoing and other objects, aspects, features, and advantages of the invention will become more apparent from the following description, figures and claims.

BRIEF DESCRIPTION OF THE DRAWINGS

In the drawings, like reference characters refer to the same parts throughout the different views. Also, the drawings are not necessarily to scale, emphasis instead being placed upon illustrating the principles of the invention.

DETAILED DESCRIPTION OF THE PREFERRED EMBODIMENTS

Figure 1:
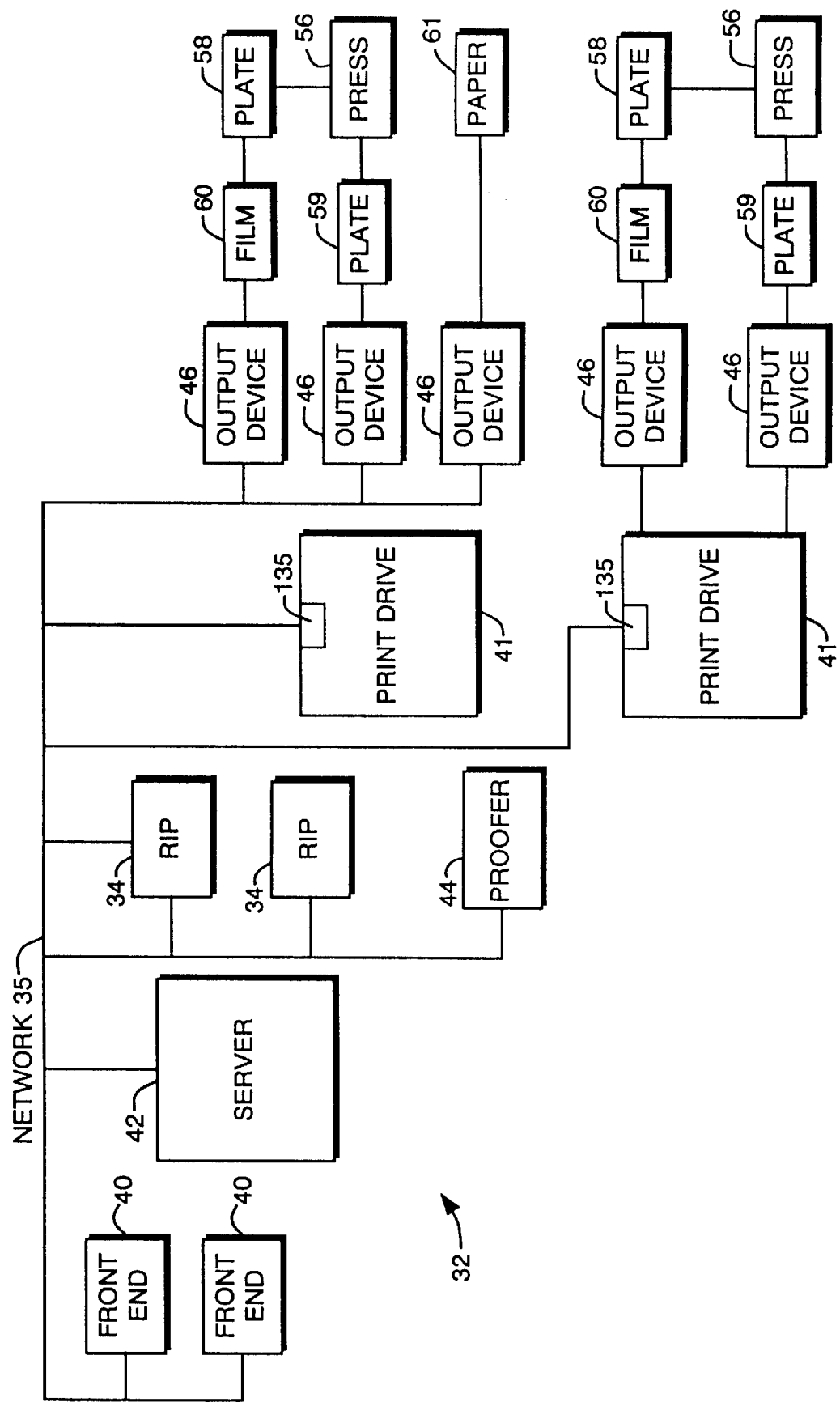
FIG. 1 is a block diagram of an embodiment of a prepress imaging system according to the present invention.

Referring to FIG. 1, a prepress system 32 includes one or more computers that are referred to as front ends 40. The front ends 40 are connected to computer network 35. The front ends 40 are used for system configuration, as well as for creating, editing, or otherwise processing image data. Both color and black and white images are prepared on the front ends 40 for processing by the prepress system 32 and eventual image reproduction by a printing press 56 using a printing plate 58. The front ends 40 are typically commercially available computers running on operating systems such as Windows NT™, Mac OS™, or UNIX™ or the like. The front ends 40 have imaging application software such as the commercially available Quark Express™ and Adobe PageMaker™, or any other similar software. The front ends 40 may also have imposition software used to lay out pages within an image, such as Impostrip™ or any other impositioning software. Impositioning software positions one or more pages within an image, so that multiple pages are presented in a single image. Having multiple pages imaged on a single plate increases productivity, because multiple pages are printed at the same time. The imaging application software and the imposition software both produce images coded in a page description language. The front ends 40 can output images coded in a page description language directly to one or more raster image processors 34 via the network 35. The front ends 40 can also provide images to one or more image servers 42, or to a proofer 44 via the network 35.

The network 35 can be any of the various types of commercially available computer networks, but must be of sufficient capacity to handle the traffic generated by the prepress system. In one embodiment, the network is a Fast Ethernet network, including a 100 baseT Hub and appropriate connections between the networked components and the hub.

In one embodiment, an image server 42 receives and stores images from the front end 40. Image server 42 can queue jobs for immediate transmission to an available RIP 34. Image server 42 can also store images from the front end 40 for later processing by RIP 34. Image server 42 helps improve workflow efficiency by allowing front end users to output their jobs even if the RIPs 34 are busy. By queuing jobs for RIPs 34 on servers 42, the RIPs 34 can be kept continuously busy.

The RIPs 34 may be software RIPs operating on a computer system, which may be one of the front ends 40, or other computer systems. The RIPs may be software RIPs such as the Agfa Viper™ software RIP and the Agfa Taipan™ software RIP, or hardware RIPs such as the AgfaStar™ hardware RIP, each of the above RIPs being commercially available from Agfa Division of Bayer Corporation in Wilmington, Mass. Each RIP 34 has a software and/or hardware RIP module for RIP functions such as screening, trapping, imposition, page or image combination, color separation and color management of image data.

The RIPs 34 each include a bi-directional network interface module 135 (see FIG. 3) over which PDL files are received from front ends 40 or the image servers 42. Each RIP 34 thus appears on the network and can be accessed by any front end 40 or any image server 42 on the network 35. The network interface module 135 also serves as an output interface for communication of the RIP 34 through the network 35. In another embodiment, separate hardwired input and output connections are used between each RIP 34 and its associated print drive 41.

A print drive 41 includes a plurality of software modules operating on a standard computer platform configured for efficient print drive functions. The print drive hardware may also include a number of interface boards or modules including a fast network interface and hardware connection to an output device 46. Print drive 41 receives raster data from the RIPs 34 which it can either store or immediately send to an output device 46, depending upon instructions programmed by the operator. Print drive 41 may be connected to the RIPs 34 via the network 35, or may have individual connections to the RIPs. The print drive 41 may be directly connected to the output devices 46, as shown in the embodiment of FIG. 1, or it may connect with the output devices 46 via network 35, or via other connections. The output devices 46 include imagesetters, platesetters, printers, plotters and other devices which accept and/or output raster data.

An output device 46 can be an imagesetter which images onto photosensitive film 60 or paper 61. The photosensitive film 60 is used to make at least one plate 58. A plate 58 is used on press 56 to print one color separation of an image. On a black and white image, only one color, black, may be necessary. For a color image, generally at least the three colors, cyan, magenta, and yellow, and often a fourth color, black, are used. One or more "spot color," which refers to an additional color, may be used as well. The imagesetter images the raster data for each color separation onto film, and the film is used to make a plate 58. The plates are then used on the press to print high quality printed material, often in large quantities. Examples of imagesetters are the Selectset Avantra®, the SelectSet® 7000, and the AccuSet® Plus imagesetters, all available from Agfa Division, Bayer Corporation of Wilmington, Mass.

An output device 46 can also be a direct-to-plate or computer-to-plate device such as a platesetter which images directly onto a plate 59, without the use of film 60. By use of a platesetter 64, the step of creating a plate 58 by using film 60 is eliminated, improving workflow and eliminating the costs involved in making a film. Examples of platesetters are the Agfa Galileo™ platesetter and the Agfa Polaris 100™ digital platesetting system, available from Agfa Division, Bayer Corporation of Wilmington, Mass.

Figure 2:
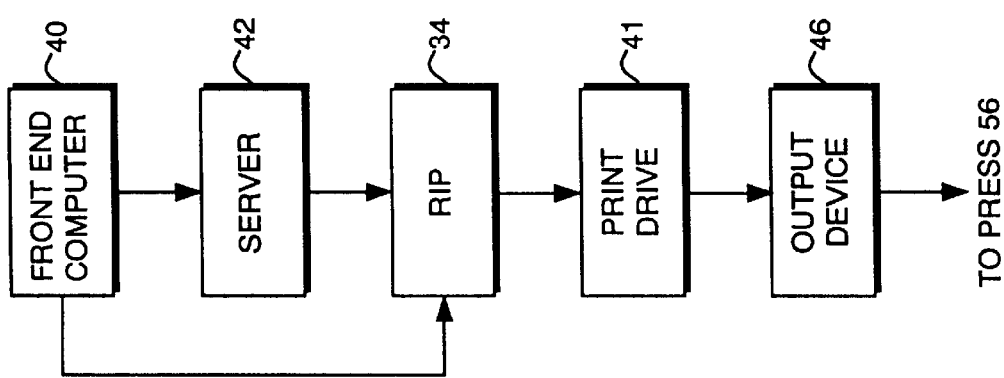
FIG. 2 is an embodiment of a flowchart of the workflow of a job in the prepress imaging system of FIG. 1.

Referring to FIG. 2, the work flow through the system of FIG. 1 begins with the front end 40. The image is designed using an imaging application such as PageMaker™. An exemplary image includes both text and graphics, and the image may be impositioned on the front end 40, meaning that a number of pages are placed appropriately within a flat. The front end 40 may queue the image for processing by sending the job to the image server 42. Alternatively, the front end 40 may output the job directly to a RIP 34. Use of an image server 42 provides the system operator with more constant utilization of the front end 40 and the RIP 34 because neither the front end 40 nor the RIP 34 wait for the other. The image is transmitted to the RIP 34 by either the front end 40 or the image server 42. The image is then processed by the RIP 34. The RIP 34 outputs raster data to the print drive 41 which, in turn, stores the raster data until it is ready to be imaged onto an output device 46.

Note that numerous varied configurations of a prepress imaging system similar to that shown in FIG. 1 can be utilized to implement the principles of the current invention. For instance, the system could include any combination of the following: one or more front end computers 40; one or more servers 42; one or more RIPs 34; one or more proofers 44; one or more print drives 41; and one or more output devices 46. Any number of printing presses 56 could be thereafter connect to the prepress imaging system. Although included in the flowchart of FIG. 1 for completeness of the image origination to printing process, the press 56 is actually not part of the prepress imaging system. Furthermore, although the preferred embodiment calls for the output device 46 to be a print engine, the output device can be any destination device or application which accepts raster data, such as a hard drive for storage. A print engine output device 46 can render an image onto any known media such as paper, film or plate. Although frequently a RIP 34, print drive 41 and output device 46 will be locally situated; while the press 56, front end 40 and server 42 are remotely situated; the various components of the prepress imaging system can generally be either locally or remotely situated, subject to variables such as cable signal loss limitations, etc. Moreover, image data used throughout the prepress imaging system 32 can generally be stored in any component accessible over the network, i.e. the front end 40, the server 42 or the print drive 34.

Figure 3:
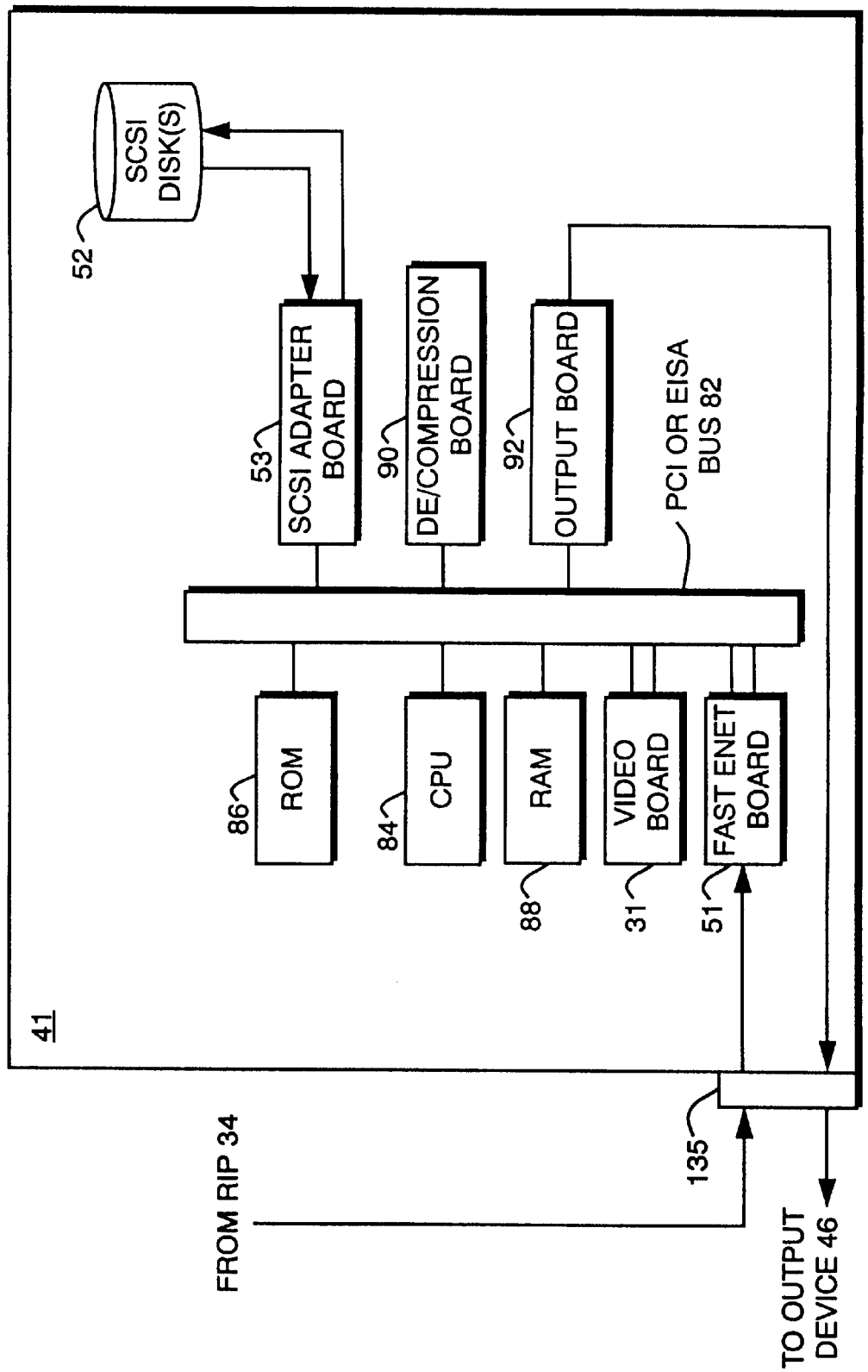
FIG. 3 is a block diagram of an embodiment of the print drive of the prepress imaging system of FIG. 1.

Referring to FIG. 3, one embodiment of a print drive 41 includes at least one CPU 84 connected to a multiple connection system such as a PCI or EISA bus 82. Other bus configurations are also suitable. In one embodiment CPU 84 is an Intel Pentium™ processor. Many other commercially available processors are also suitable. Print drive 41 also includes ROM 86, RAM 88 and a fast Ethernet board 51. Enough RAM 88 is necessary to support the operating system and to process the raster data sent and received by the print drive 41. A SCSI adapter board 53 is connected to the bus 82 and at least one SCSI storage device 52, e.g. a hard disk. Print drive 41 includes a compression/decompression board 90 for compressing and decompressing files, as well as an engine interface or output board 92 for direct connection to an output device 46. The network interface module or print drive interface terminal 135 is the hardware interface between the print drive 41 and the network 35.

Figure 4:
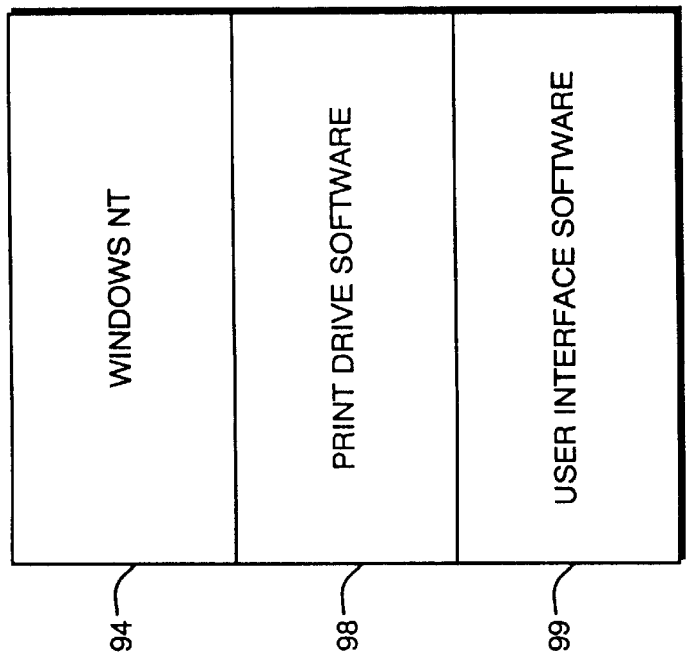
FIG. 4 is a block diagram of an embodiment of the software for the print drive of the prepress imaging system of FIG. 1.

Referring to FIG. 4, in one embodiment the print drive 41 uses the Microsoft Windows N™ operating system 94. The print drive software 98 runs in coordination with the operating system 94 to interface with the hardware components of the system. The print drive software operates as a set of Windows NT™ services which are configured, started, and stopped by an NT service manager. User interface software 99 directs the activities of the print drive 41 using print drive software 98.

For example, the user interface software 99 allows the user to perform local setup and configuration whereby the user configures the print drive 41 for an output device 46 to which it is connected. The user interface software 99 is also used to control the work flow and the raster data processing features. The user interface software 99 runs on the print drive 41 and is also capable of running on workstations such as front ends 40 or other computer systems connected either locally or remotely to the network 35. Remote users of the user interface software 99 have access to the same control features as users of the user interface software 99 running locally on a print drive 41.

Figure 5A:
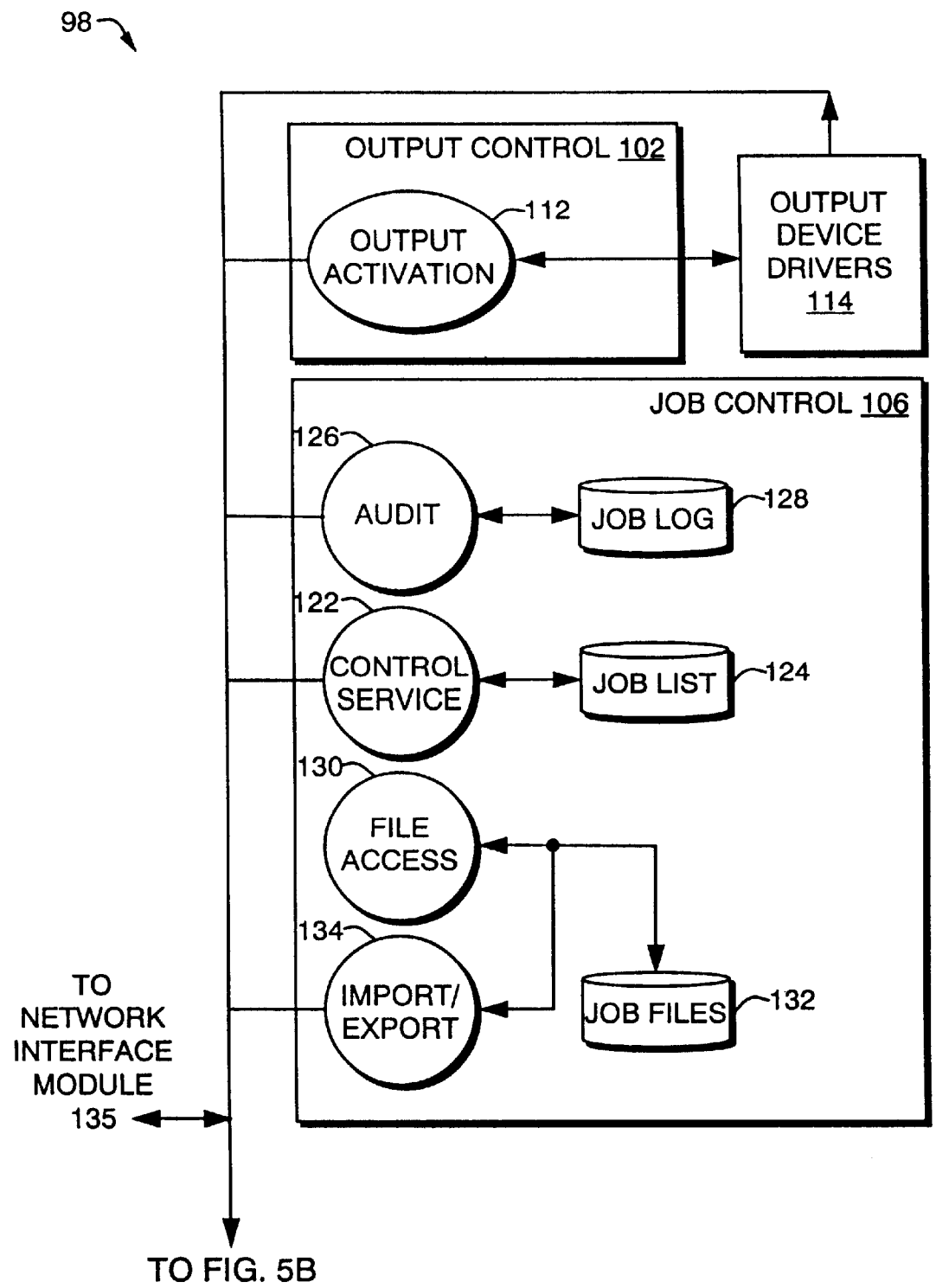
FIG. 5 is a block diagram of an embodiment of the functional elements of the print drive software of FIG. 4.
Figure 5B:
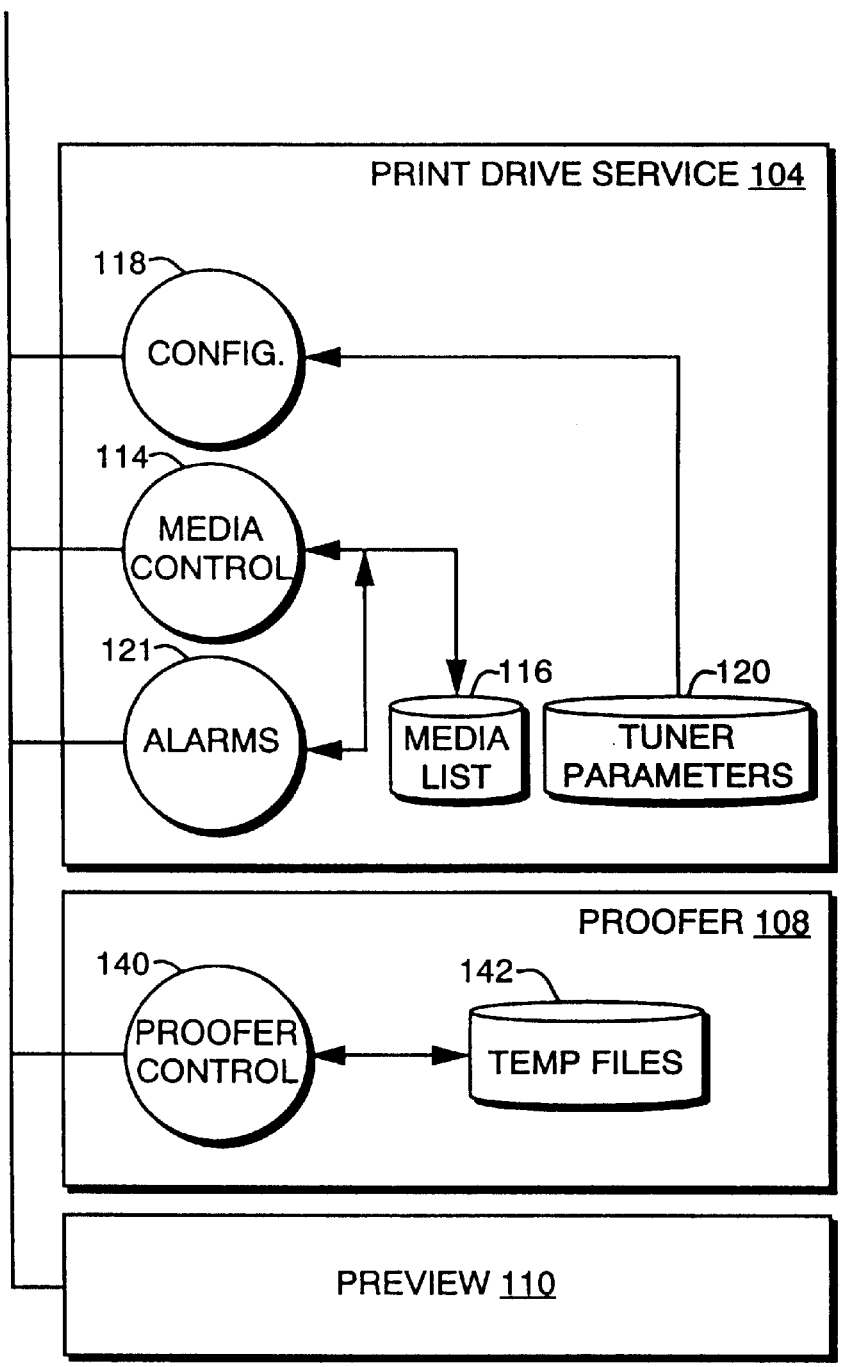

In more detail, and referring to FIG. 5, the print drive software 98 includes an output control system 102. The output control system 102 includes an output control interface subsystem or output activation system 112. The output control interface subsystem 112 communicates with output device drivers 114 to transmit raster data to an output device 46. The output control system 102 can reactivate the device drivers 114 in the case of error.

The print drive software 98 also includes a print drive service system 104. The print drive service system 104 includes a media control subsystem 114. The media control system 114 provides an interface to the media list 116, which contains information about each type of media available to the print drive 41. Information about the media types supported on the installed output devices 46 are made available to a RIP 34 via this subsystem 114. Initial mapping of media types is done when an output device 46 is installed and may be changed at any time through the user interface software 99.

The print drive software 98 includes a configuration subsystem 118. The configuration subsystem 118 works with the user interface software 99 to configure the print drive software 98. In one embodiment, configuration parameters 120 are stored in the SOFTWARE section of the NT registry and the configuration subsystem 118 provides an interface to this data. Alarms subsection 121 provides alarms if errors are encountered. Alarms can sound on the print drive 41 or on computers 40 connected to the print drive 41 via the user interface software 99.

Job control system 106 receives, stores, and initiates output of raster data. The job control service 122 provides access to the data and functions associated with a job list 124 which is a list of all raster data contained in the system 32. The raster data is organized by image and color separations, so that the job list 124 holds the location information and status for all raster data associated with a job. All files for a job are written to a data storage area of the print drive 41 or in other accessible memory elsewhere in the system 32, such as in the front end 40 or the server 42. In one embodiment, each color separation is stored in its own job file in TIFF format. All color separations and their descriptive names are stored in the job list 124. These files are accessed through the job control service 122. File operations supported by the job control service 122 include addition of new jobs, deletion of job files, replacement of job files, and marking color separations as "imagable" and "not imagable."

The job control service 122 also includes a job picker. The job picker determines how jobs on the job list are chosen for output to the currently connected print engine 46. The job picker scans the job list 124 for all jobs that can be output at that time. The determination of which jobs to output is based upon how the job picker is configured. For example, with regard to media, the job picker can be configured to use the media type and size indicated by the RIP 34 when it sent the job, use the media type indicated by the RIP 34 but image on any size media (as long as it is large enough for the image), or to ignore the media type and size specified by the RIP 34. The job picker can also be configured to conserve media, also referred to as media optimization. The job picker can be configured to always optimize using spindles when no media size is used, meaning that a choice of media will be made to use the smallest media possible for an image. Alternatively, the job picker can be configured to use ganging on loaded media, meaning that jobs for the same media will be imaged immediately after each other, to reduce inter-image media waste. Ganging will give priority to images that can use the media that is already loaded on the machine. The job picker can also be configured not to try to conserve media, or to use the media optimization specified by a particular print job. The job picker can also be configured for a number of jobs that can precede the next job in the list so that they can be imaged on the same media. When that limit is exceeded, a change media command is sent to the output device 46 so the next job in the list 124 can be run.

The job audit log subsystem 126 provides access to the job audit log 128. The job audit log 128 is used to record transactional job oriented events occurring on any part of the print drive system 32. The job audit log 128 persists even after a job is deleted. The persistence time of the job audit log files 128 is configurable.

Job files are stored and accessed using the file access subsystem 130. In one embodiment, job raster data is stored in TIFF format, and the raster data for each color separation is stored in a separate file in the jobs data store 132. All information regarding a job is stored either in the job list 124 or in the job files 132. Typical job list information is that which relates to the job as a whole, such as priority, media type, and processing options. Typical job file information includes when and where to print a job, how many copies to print, how many images per flat will be printed, etc. The job list and job file information is used by the job control service 122 to schedule a job for imaging.

The import/export subsystem 134 provides a mechanism for files to be imported and exported from or to other file systems connected to the network 35. This mechanism allows for the archiving of files in the job list 124. Files can be copied to any local or networked disk device. Import allows a new job to be created by importing the raster data, and creating, via the job control service 122, a directory in which to copy the job files. The job control service 122 adds the copied files to the job list 124.

The print drive software 98 can also include such other functionality as proofer system 108, which includes proofer control 140 to convert raster data files for imaging on a proofer 44.

Temporary proofer files are stored within a temporary store 142. The preview system 110 provides access to the jobs in the job list 124 for user review on a computer monitor. Jobs are accessed via job control service 122. Raster data may be compressed using compression board 90. The resolution may also be reduced to match the resolution of a computer monitor, which is much less than the resolution of a print engine 46. A preview image is generated from multiple color separations, and is sent in screen resolution to a preview client application.

The print drive 41 receives raster data from the RIP 34 and outputs the raster data to output device 46, thereby providing work flow and efficiency benefits. In addition, the print drive 41 is capable of manipulating raster data in a way that was not previously possible. Specifically, the print drive can combine color separations from the same or different images after the images have been processed by the raster image processor 34. This provides the user with the capability of modifying raster data after it has been processed by the RIP 34. The print drive 41 includes operation as a digital image combiner, such as a digital doubleburner that combines two images onto the same plate. The print drive 41 also provides a masking operation as part of the digital image combiner for combining images to mask out part of an image, which is the electronic equivalent of deleting a section of imaged film. The digital masker and digital doubleburner can be accessed through the job control service 122, which is accessible to the user via the user interface software 99. The digital masker and digital doubleburner both take into account the photometric interpretation, i.e. the negative or positive polarity of the image. This information is included on the job list.

Figure 6:
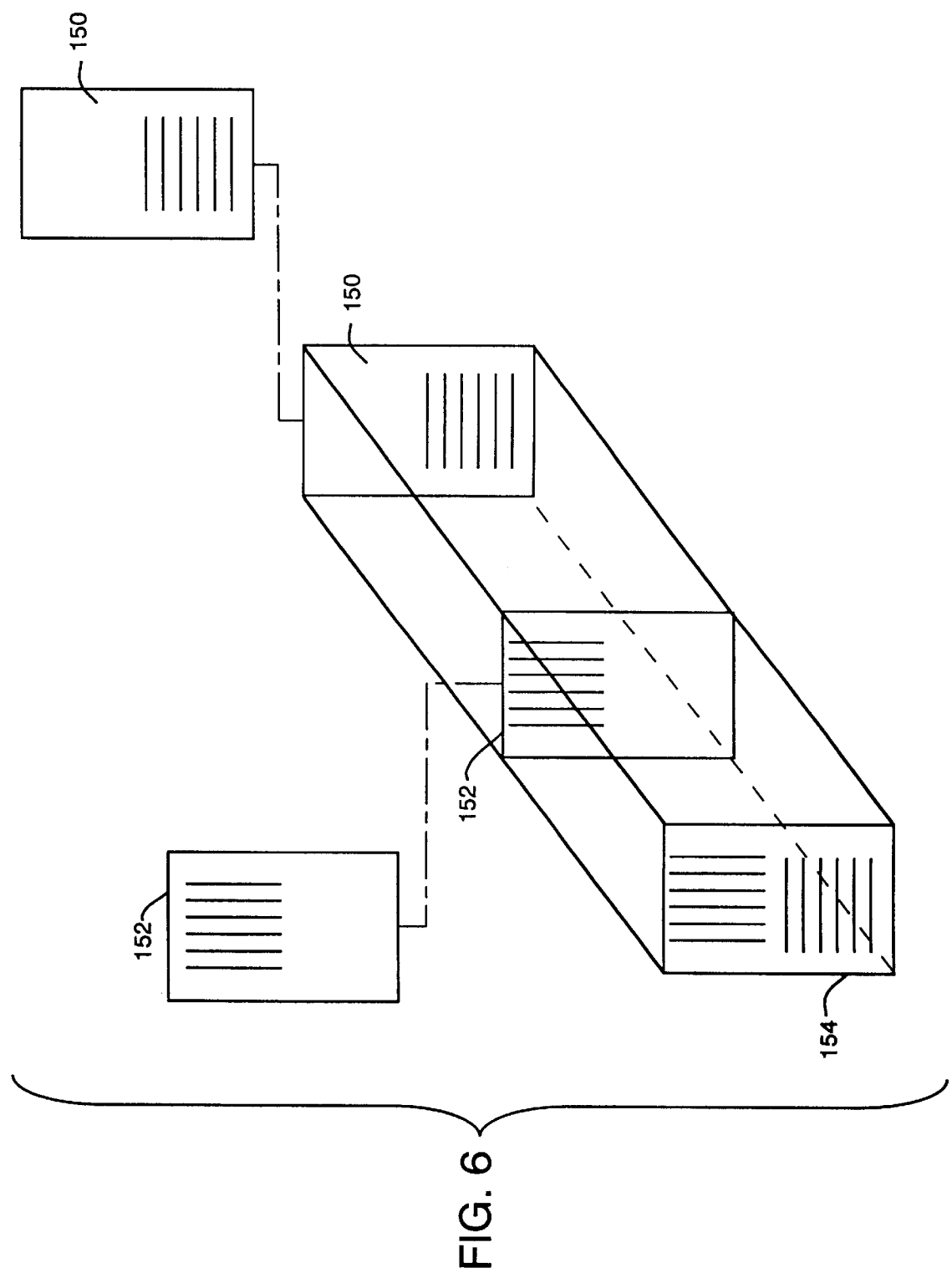
FIG. 6 is an example of combining raster data by digital doubleburning in the print drive of the prepress imaging system of FIG. 1.

Referring to FIG. 6, the print drive 41 facilitates the digital doubleburn operation by combining two files of raster data, i.e. first raster data 150 and second raster data 152, which have been separately RIPed from separate images. The raster data from the two images is combined by overlaying the raster data from one image onto the raster data of the other image so that the relative positioning of the first raster data 150 and the second raster data 152 is maintained, as shown in the figure, to yield the combined raster data 154 representing a resultant image. This is very useful because the image modification occurs after the original PDL image data has been processed by a raster image processor 34 and converted to raster image data. When a RIP 34 is connected directly to an imagesetter output device 46, i.e. when no print drive 41 is included in the prepress work flow, the manipulation of image data after processing by the RIP 34 is impracticable. The operation of the print drive 41 in accordance with the principles of the present invention enables manipulation of image data after it has been processed by the raster image processor 34.

Figure 7:
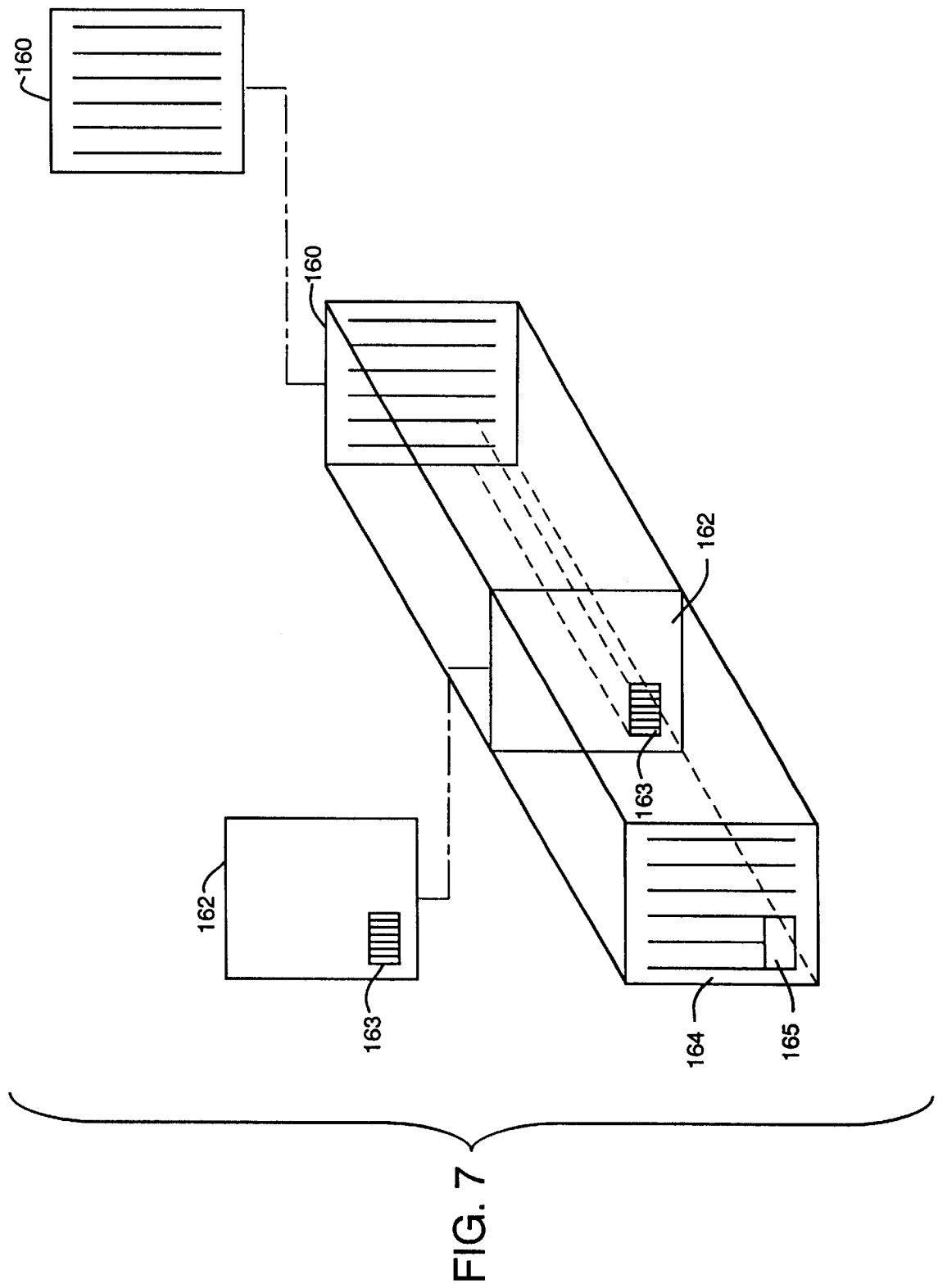
FIG. 7 is an example of masking raster data by digital masking in the print drive of the prepress imaging system of FIG. 1.

Referring to FIG. 7, the print drive 41 operates to digitally mask first raster data 160 with second raster data 162. First raster data 160 can include text and graphics data. Second raster data 162 includes a mask 163, which is an area of the image that is substantially a 100% fill. The mask area 163 defines the area to be masked in the resulting image. When first raster data 160 is masked with second raster data 162, the resulting raster data 164 has the masked portion 163 of the second raster data. The masked area 165 of the resulting raster data 164 is in the same place as the mask area 163 in the second raster data 162. When a RIP 34 is connected directly to an imagesetter, that is when the print drive 41 is not included in the work flow, manipulation of data after it was processed by RIP 34 is not possible. The print drive 41 of the present invention enables manipulation of data after it has been processed by the raster image processor 34.

Figure 8:
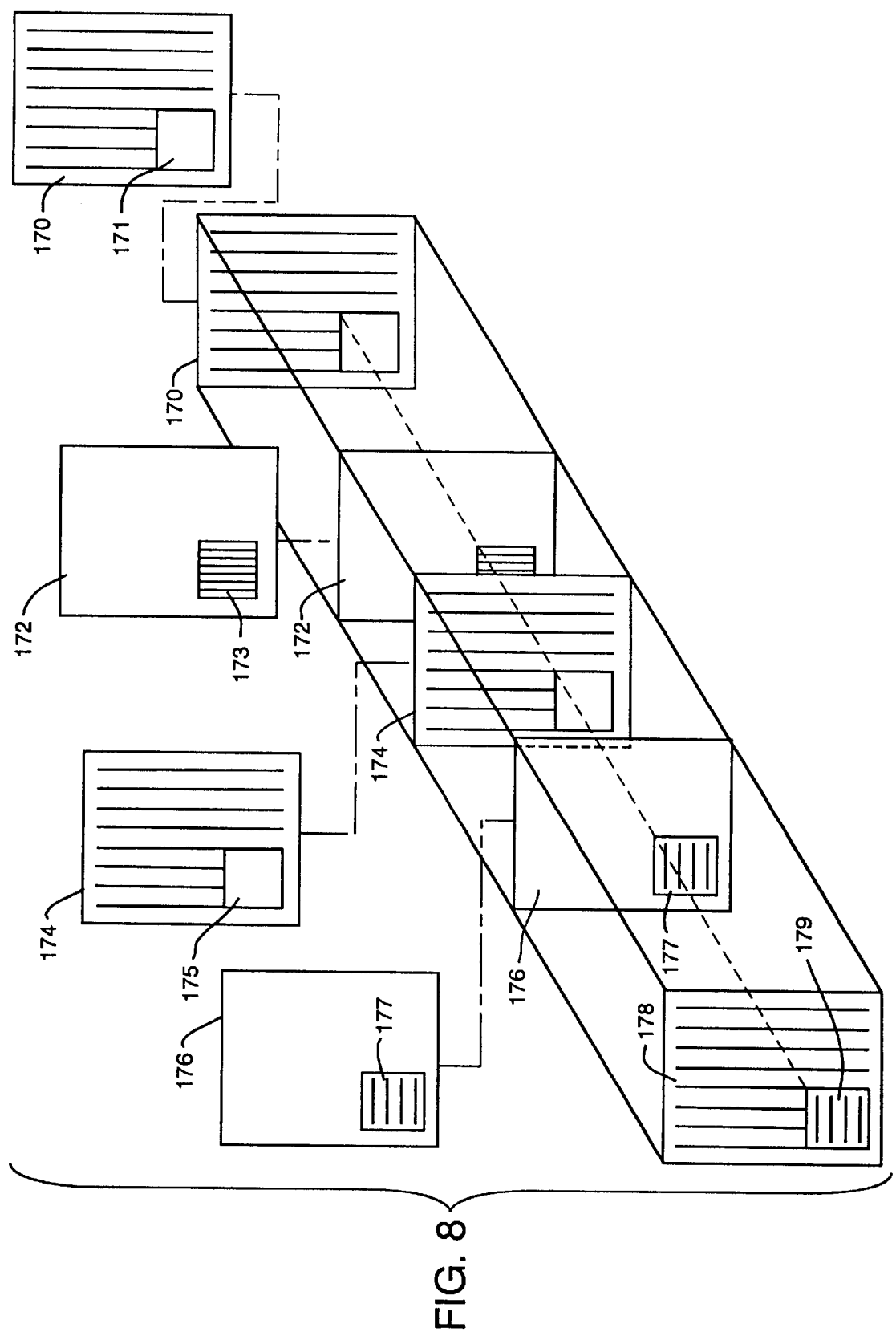
FIG. 8 is an example of modifying raster data by both digital doubleburning and digital masking in the print drive of the prepress imaging system of FIG. 1.

Referring to FIG. 8, first raster data 170 (which includes the desired modification area 171) is to be modified in area 171. For instance, there could be an error in a section of the original image corresponding to section 171 of the first raster data 170, or a desire to alter the section of the original image corresponding to section 171. Mask raster data 172 and second raster data 176 are used by the digital masker and the digital doubleburner, respectively and in combination, to modify the first raster data 170. First, the mask raster data 172 is used to mask area 171 of the first raster data 170 delineated by the mask area 173. The result is masked first raster data 174 which is a copy of the first raster data 170 with masked section 175 positionally corresponding to the mask area 173. The second raster data 176 has raster data for modification of the original image located only in the modification area 177. Thus the time for processing the second raster data 176 in the RIP 34 is only a fraction of that required to process the first raster data 170. The second raster data 176 is then combined with the masked first raster data 174 by digital doubleburning whereby the modification area 177 of the second raster data 176 is aligned with the mask area 173 of the masked first raster data 174. In this way the raster data located in the modification area 177 of the second raster data 176 and the masked first raster data 174 are combined to form modified raster data 178 which includes a modified area 179.

Figure 9:
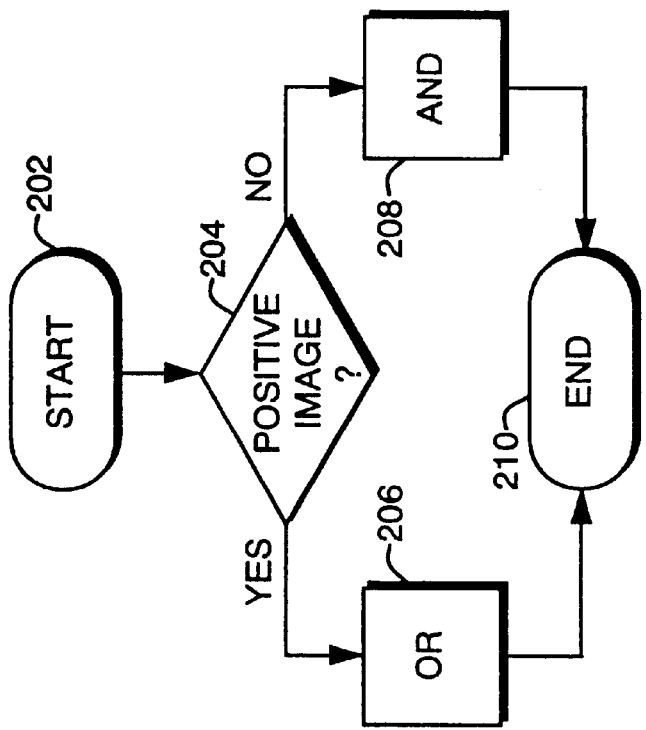
FIG. 9 is a flowchart of the operation of an embodiment of digital doubleburning in the print drive of the prepress imaging system of FIG. 1.

One embodiment of a digital doubleburning operation illustrated in FIG. 9 begins in block 202. The photometric interpretation of the two images to be doubleburned (e.g. first raster data 150 and second raster data 152 in FIG. 6) is determined in block 204. If the background of the images is black, then the images are negatives and if the background of the images is white, then the images are positive. If the images are positive, then first raster data 150 and second raster data 152 are subjected at a pixel level to a logical OR operation in block 206. If the images are negative, then first raster data 150 and second raster data 152 are subjected at a pixel level to a logical AND operation in block 208. In either case, the logical operations yield combined raster data 154 of a resultant image. The digital doubleburn operation ends in block 210.

When a digital doubleburn operation is in process, the files being merged are opened and a new, temporary file is created. If the operation fails for any reason an error message is posted and the temporary file is removed. The job is not marked in error. If the merge succeeds then the original file is replaced by the temporary file.

Figure 10:
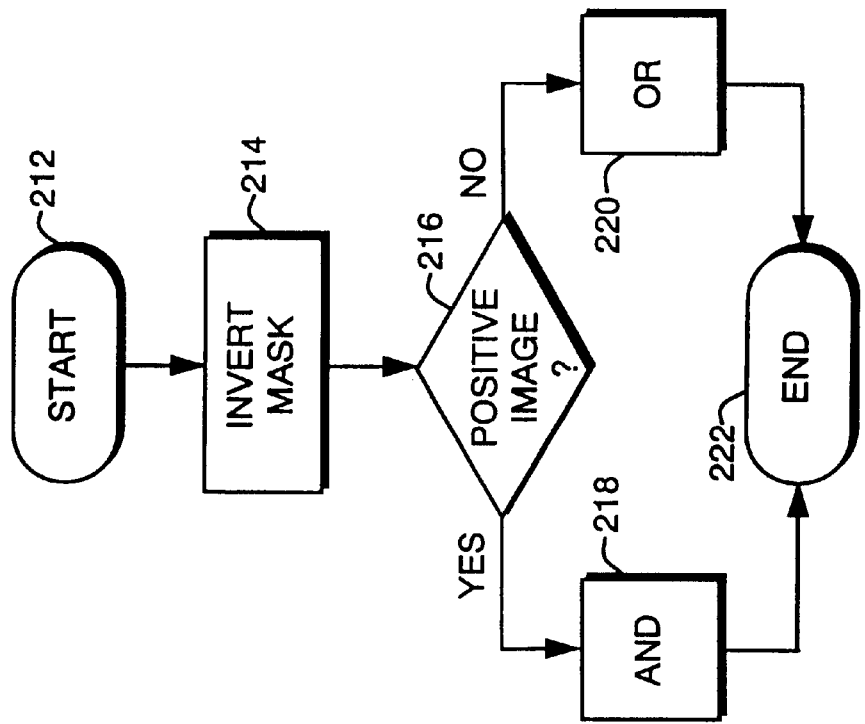
FIG. 10 is a flowchart of the operation of an embodiment of digital masking in the print drive of the prepress imaging system of FIG. 1.

The operation of a preferred embodiment of a digital masker is illustrated in FIG. 10. The process starts in block 212 and, in block 214, the mask is inverted so that the pixels that were 1 are 0, and the pixels that were 0 are 1. The digital masker next determines the photometric interpretation of the images in block 216. If the images are positive, then the first raster data 160 and the second raster data 162 including a mask 163 (see FIG. 7) are subjected to a pixel level logical AND operation in block 218. If the images are negative, then the first raster data 160 and the second raster data 162 are subjected to a pixel level logical OR operation in block 220. In either case, the logical operations yield the resulting raster data 164 having a masked area 165. The process ends in block 222.

When a digital mask operation is in progress, the files involved in the operation are opened and a new, temporary file is created. If the operation fails for any reason an error message is posted and the temporary file is removed. The job is not marked in error. If the mask operation succeeds then the original file is replaced by the temporary file.

By combining the digital doubleburner of FIG. 9 and the digital masker of FIG. 10, the print drive 41 is capable of modifying an image after it has been processed by a raster image processor 34. This type of operation has been previously illustrated in FIG. 8. The masker is used to delete a section of the image in each color separation to be modified. The digital doubleburner is used to combine the modification with the masked image.

Figure 11:
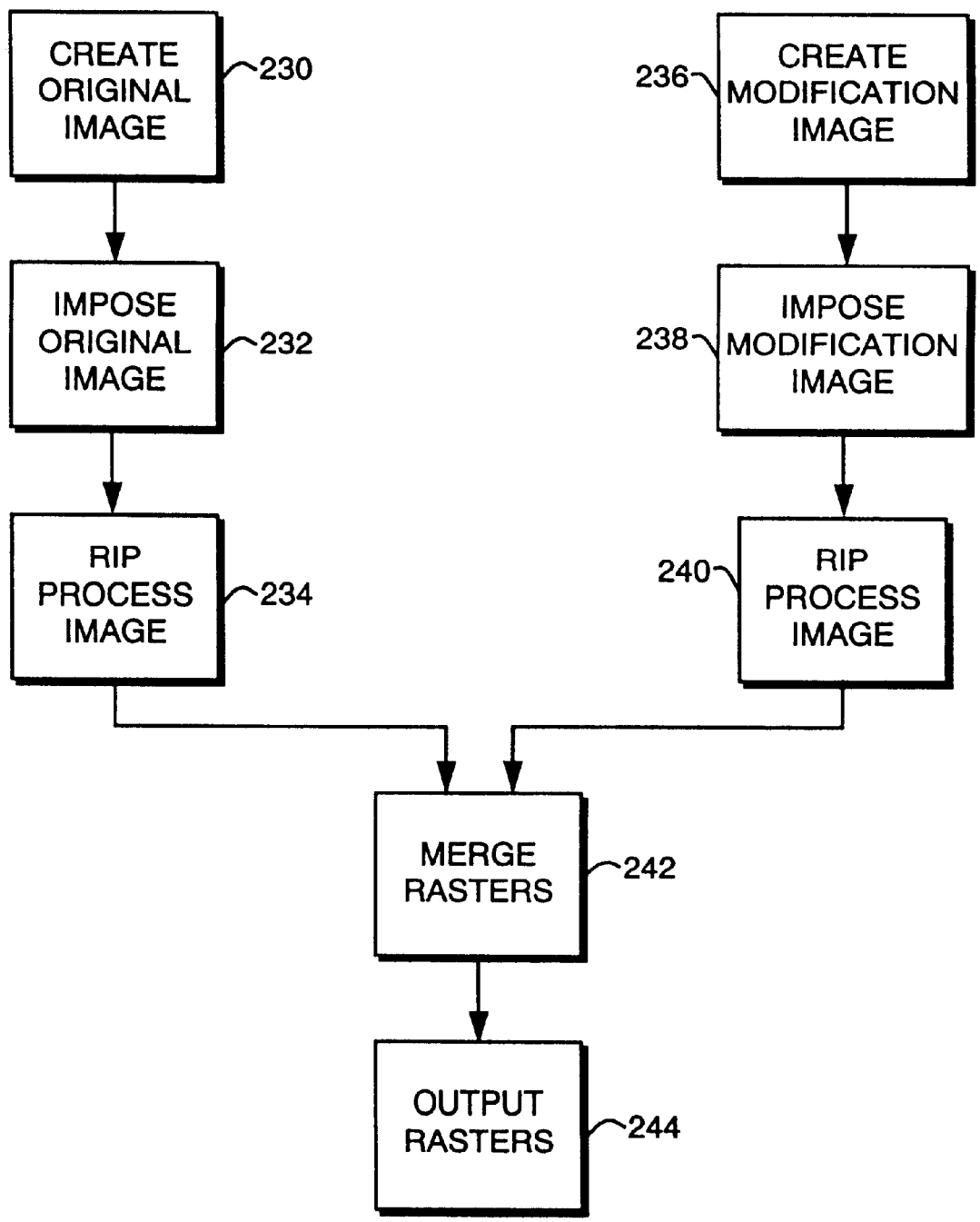
FIG. 11 is a flowchart of the processing of image data to be modified in the prepress imaging system of FIG. 1.

FIG. 11 is a flowchart of an embodiment for modifying raster data in a digital image combiner of the print drive 34 by combining digital doubleburning and digital masking operations. The first raster data 170 (see FIG. 8) representing the original image to be modified, is created in block 230 using page composition software to lay out the graphics and text for each page. Next, in block 232 the pages are positioned within the flat using either the page composition software, or imposition software to impose a plurality of pages within the image. The imposed images are then processed by a RIP 34 in block 234 to form one or more color separations of raster data per image. The raster data is output from the RIP 34 to the print drive 41, and stored thereon.

Second raster data 176 (the modification image) is created in block 236 having characteristics 177 with which to modify the first raster data 170 (the original image). The codification image may be created simultaneously with the original image, or it may be created after the original image has been printed to a proofer, paper or plate. The modification image may be a copy of the original image that contains a modification, or it may be an insert to the original image as demonstrated in conjunction with FIG. 8. The modification image contains the modification to the original image, and it also contains a mask layer, e.g. mask raster data 172. In the disclosed embodiment, the mask layer is a spot color layer created with the page composition software. The mask layer contains a substantially 100% fill mask or mask area 173 corresponding to the area 171 of the first raster data 170 of the first image that is to be corrected. The mask layer is given the specific name "mask" for identification by the print drive 34. Other techniques of identifying the mask layer can also be used, but the identification needs to fit within the workflow constraints of the prepress environment, so that the identification is made on the front end 40, and is available at the print drive 34 later in the workflow.

The second raster data 176 is imposed for proper placement on the page in block 238. Generally, the second raster data 176 is imposed in the same manner as the first raster data 170. Thus the page will be aligned so that the modification area 177 of the second raster data 176 is placed in the same location as the desired modification area 171 of the first raster data 170. If the original image included several pages, the modification image is placed where the page to be modified was placed. The other pages, which are not involved in the modification, need not be included. Including only the page to be modified will significantly shorten the RIP processing time for the modification image, yet will place the modification on the correct portion of the image.

The modification image is then processed by the RIP 34 to form color separations of raster data in block 240. The raster data for each color separation is output from the RIP 34 to the print drive 41 where it is stored in the RAM 88 or ROM 86. The first raster data 170 and the second raster data 176 are merged, as previously described, in block 242 by digital doubleburning and masking on the print drive 41 to generate the modified raster data 178. The digital masker masks the desired area for correction 171, and the digital doubleburner combines the masked first raster data 174 with the second raster data 176, forming the modified raster data 178. The modified raster data 178 is listed on the job list 124, replaces the first raster data 170, and is available for output in block 244.

Figure 12:
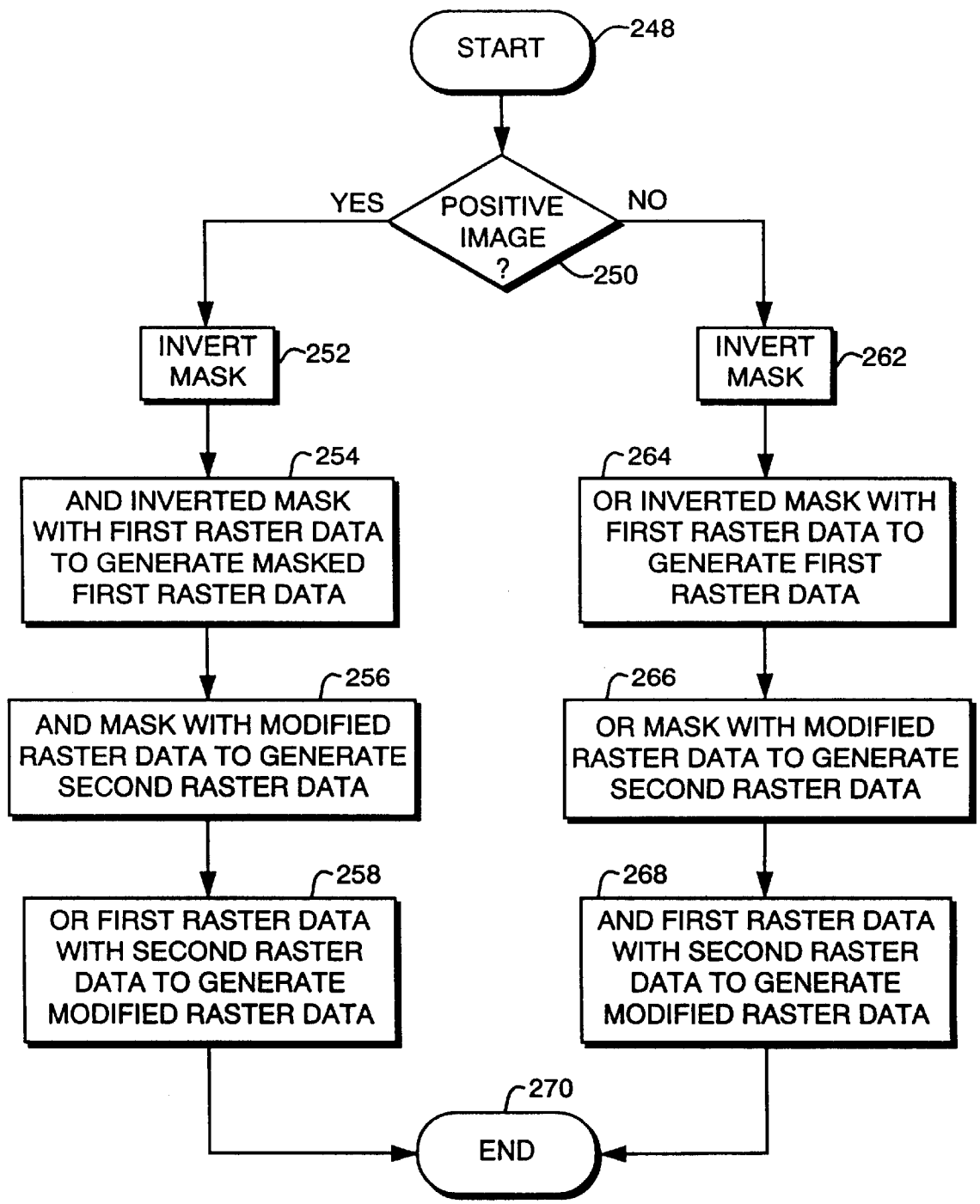
FIG. 12 is a flowchart detailing the Merge Rasters step of FIG. 11.

Referring to FIG. 12, the modification process is described in more detail. The process starts in block 248 and the photometric interpretation of the images to be combined is determined in block 250. If the images are positive, the logical AND operation is used for masking and the logical OR operation is used for doubleburning. If the images are negative, the logical OR operation is used for masking and the logical AND operation is used for doubleburning. Digital masking and doubleburning will occur for each color separation. The mask is inverted in blocks 252 and 262 so that the area outside of the mask is retained. Then the inverted mask raster data is combined with each color separation in blocks 254 and 264 to generate masked first raster data 174. In blocks 256 and 266, the mask is combined with modified raster data (i.e. data which the user wishes to combine with or alter from the original image) to generate second raster data. The uninverted mask raster data is used for this purpose, so that the part of the second image used to modify the original image will be delineated by the mask. If the front end user is given the burden including only the modification in the second image, and no extraneous data, this step is not necessary. Masking the second image raster data makes the process less complicated for the front end operator because the front end operator does not have to be concerned about imaging artifacts outside of the mask area. Finally in blocks 258 and 268 the modified raster data 178 is generated by combining the first raster data 170 with the second raster data 176. The above steps are repeated for each color separation of the original image.

It should be noted that process steps not dependent on each other can be accomplished in a different order. For example, the step of ANDing the mask with the modified raster data in block 256 could be accomplished prior to inverting the mask in block 252. In one embodiment, the modification is optimized so that multiple operations occur on raster data associated with a first image and a second image simultaneously. This procedure is faster than performing a mask operation followed by a doubleburn.

The digital doubleburner and digital masker are actually implementations of the hardware components of the print drive 41 (see FIG. 3). For instance, the methodology is carried out primarily in the CPU 84 with various information stored in either RAM 88 or ROM 86 such as the first raster data 150, the second raster data 152, the combined raster data 154, the first raster data 160, the second raster data 162, the mask 163, the resulting raster data 164, the masked area 165, the first raster data 170, the mask raster data 172, the mask area 173, the masked first raster data 174, the masked section 175, the second raster data 176, the modification area 177, the modified raster data 178 and the modified area 179. Specifically, the various method steps are implemented through the operation of the computer capability of the print drive 41. Hence, any general purpose or special purpose computer system can be used to implement the digital doubleburning and digital masking techniques of raster data as described herein.

Figure 13A:
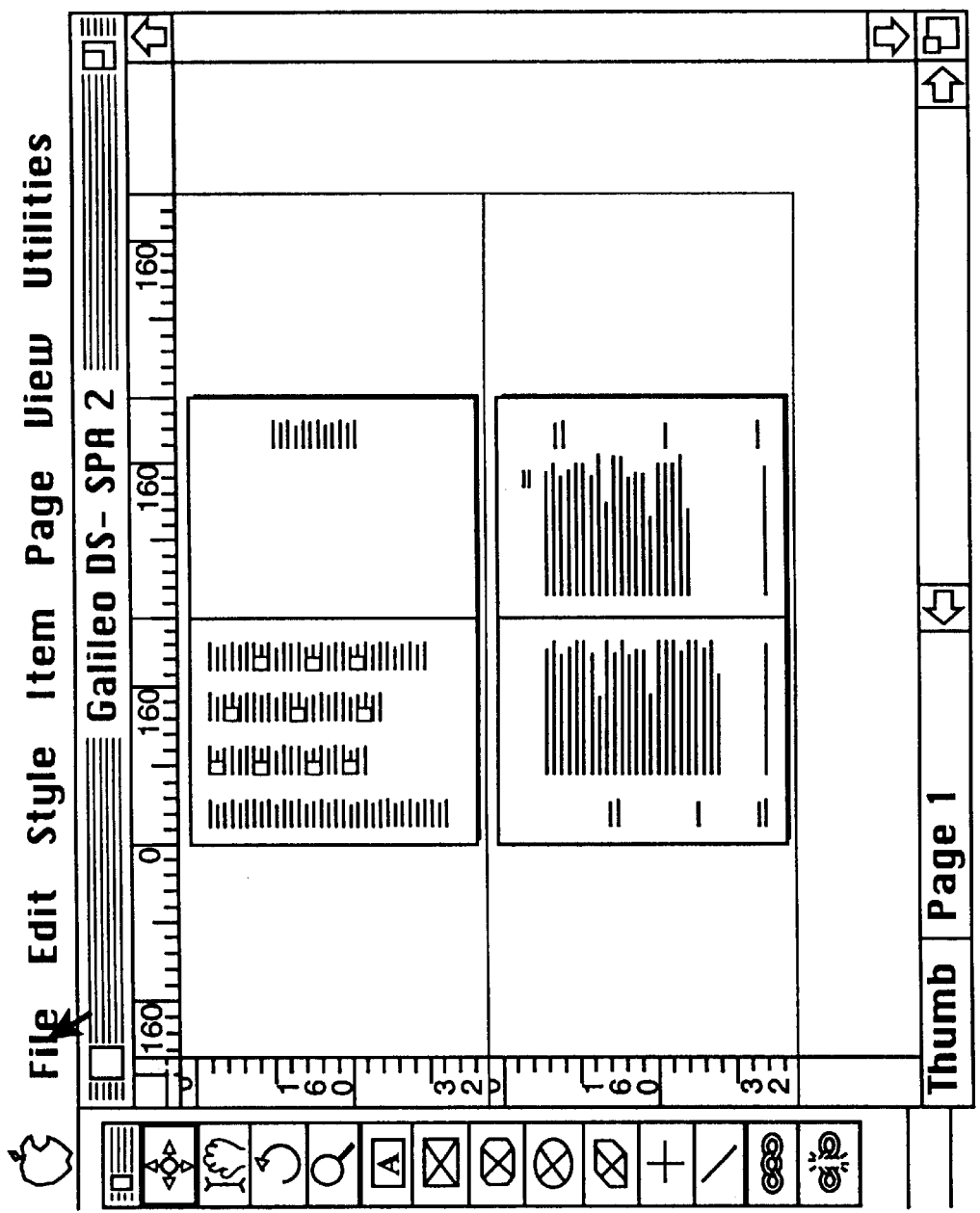
FIGS. 13A–13E are examples of an user interface for digital doubleburning of raster data in the print drive of the prepress imaging system of FIG. 1.
Figure 13B:
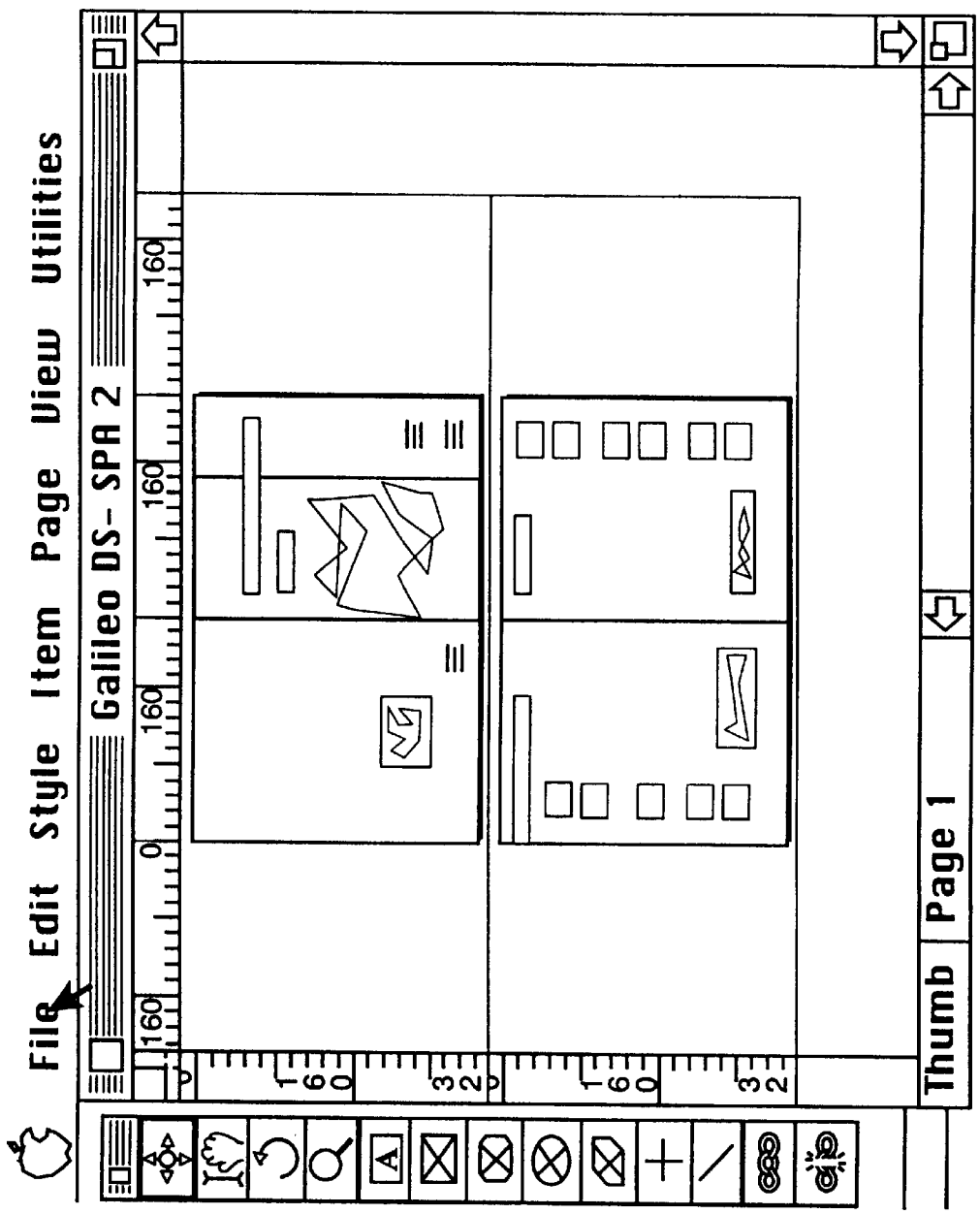

FIGS. 13A–13E illustrate a preferred user interface for the digital doubleburn operation. Referring to FIG. 13A and FIG. 13B, an embodiment of the digital doubleburner can combine two images after the images have been processed by the RIP 34. In this example, two images, one having text (FIG. 13A) and one having graphics (FIG. 13B) are combined. Each image has four pages in the flat. The text is in the French language. The system operator uses the digital doublebum capability of the print drive 34 to merge the French text with the black separation raster data of the processed graphics image. The example job is called "jerry-3.preps." The user uses the user interface software 99 to access the job list 124. In the job list 124, the user selects the raster data to be merged and drags the raster data to be merged onto the raster data it is to be combined with. An AddSeparation dialog box appears, and the user selects the option of "Doubleburn" and clicks "OK".

Figure 13C:
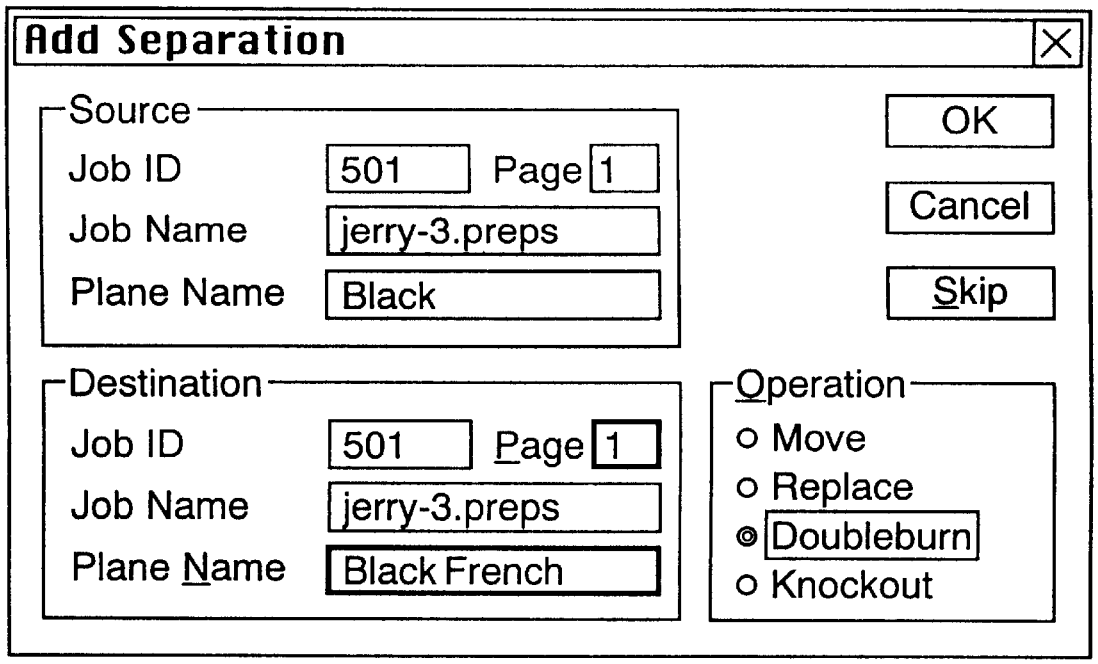

Referring to FIG. 13C, the graphical user interface of the AddSeparation dialog box shows that the "Black" raster data from page 1 of the job jerry-3.preps is being merged with the "Black French" raster data from page 1 of the same job. Note that the JobID of both the black raster data and the black French raster data is the same, implying that both sets of raster data are from the same job.

Figure 13D:
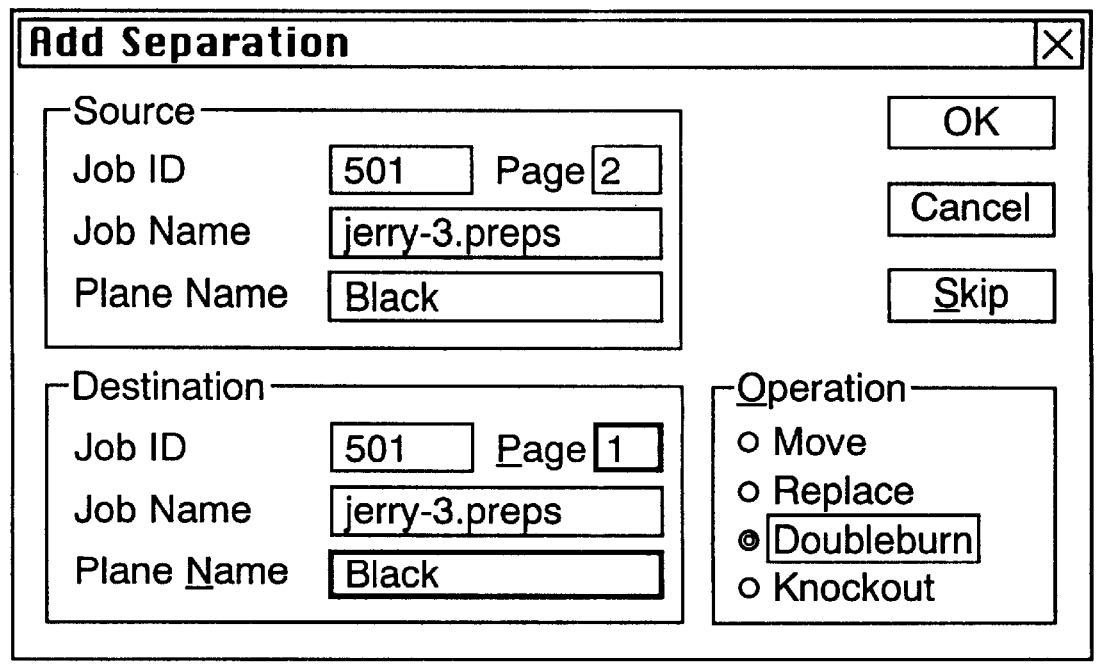

Referring to FIG. 13D, in another embodiment of the graphical user interface, the system operator merges page 2 of a job with page one of the same job. The AddSeparation dialog box shows that the Black raster data from page 2 of JobID 501, JobName "jerry-3.preps" will be merged with the Black raster data from page 1 of the same job.

Figure 13E:
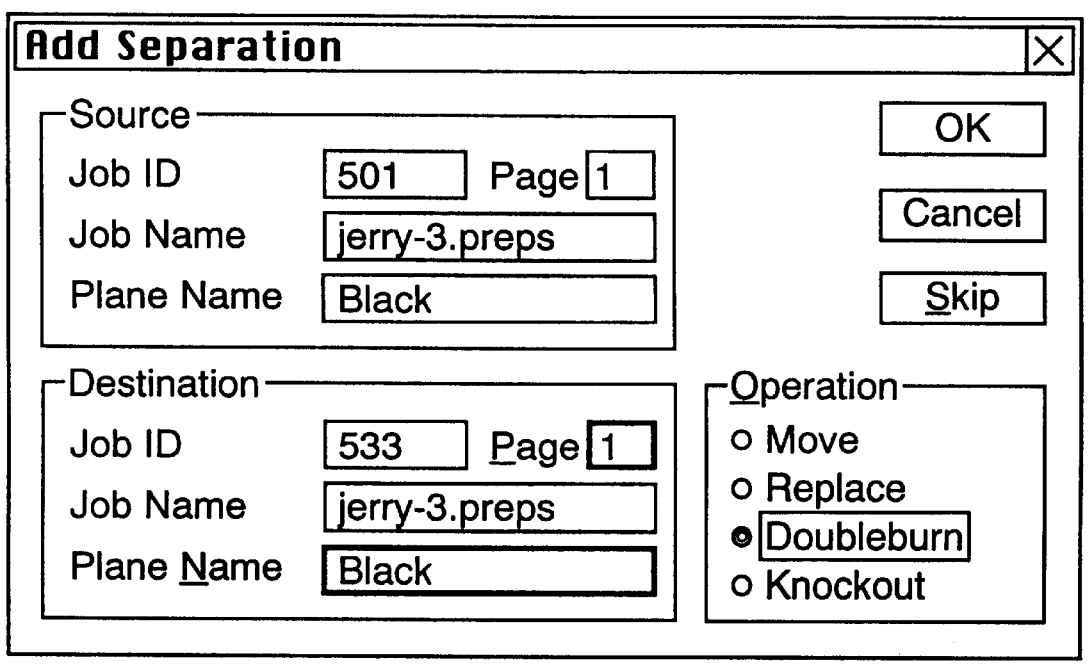

Referring to FIG. 13E, in yet another embodiment of the graphical user interface, the merge data and the base data are in separate jobs. The user opens the job list and views the details for each job. The user then selects the raster data to be merged and drags the raster data to be merged onto the raster data with which it is to be combined. The AddSeparation dialog box appears and the user selects the Doubleburn operation. In this embodiment, the Black raster data from Page 1 of job 501 is merged with the Black raster data from page 1 of Job 533. Both jobs have the same job name, but different job numbers.

Figure 14A:
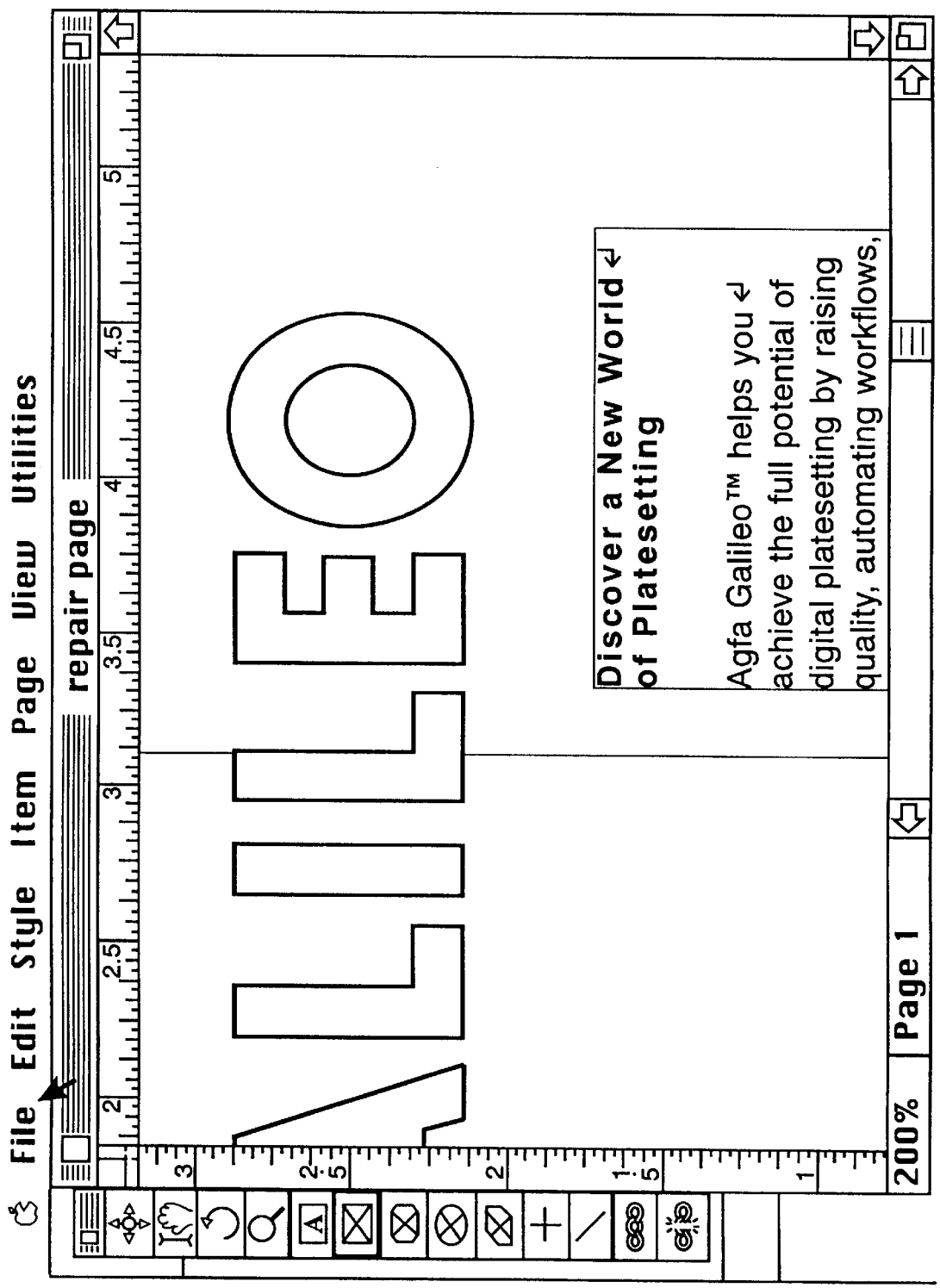
FIGS. 14A–14I are examples of an user interface for the modification of raster data in the print drive of the prepress imaging system of FIG. 1.
Figure 14B:
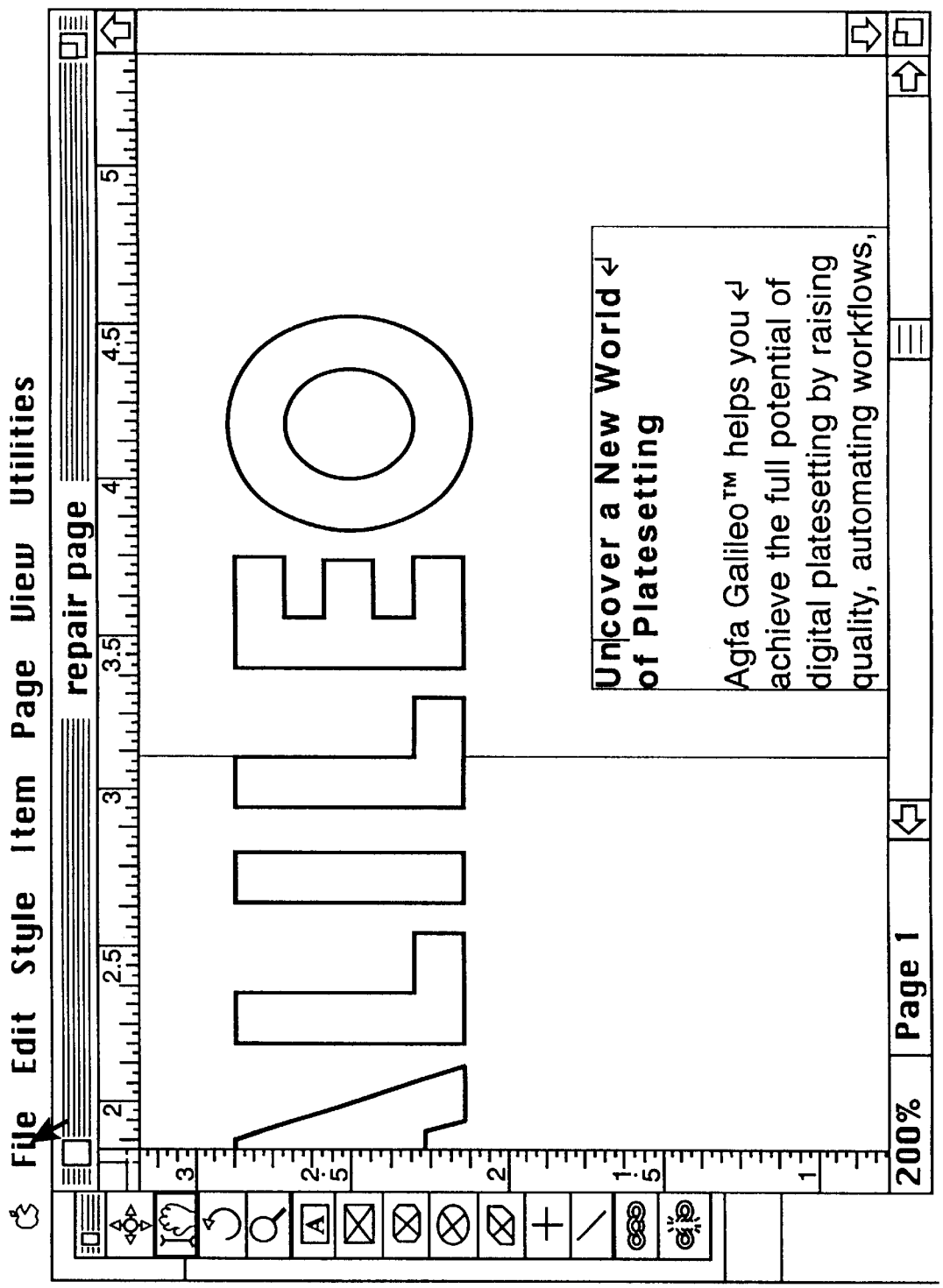
Figure 14C:
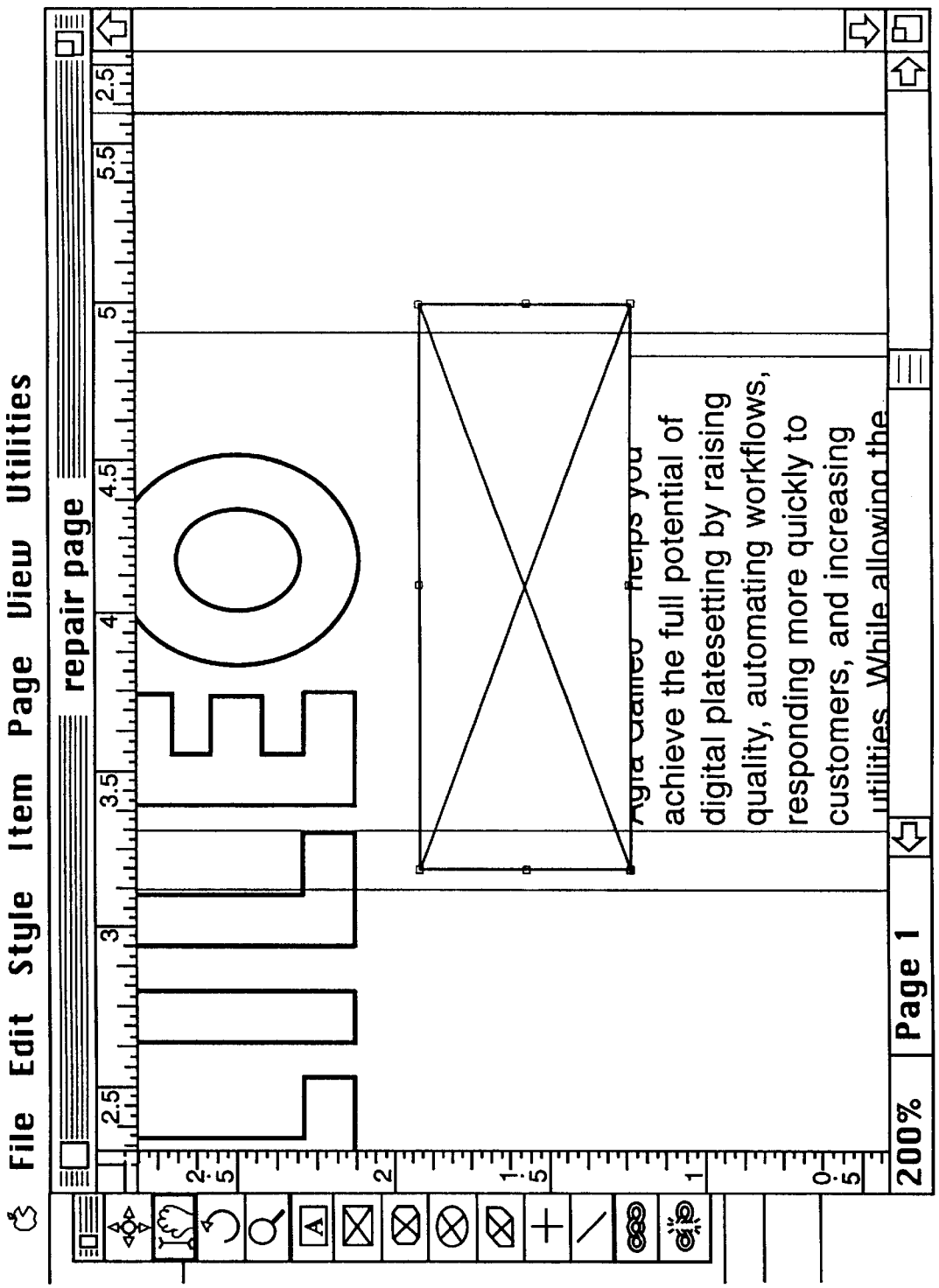
Figure 14D:
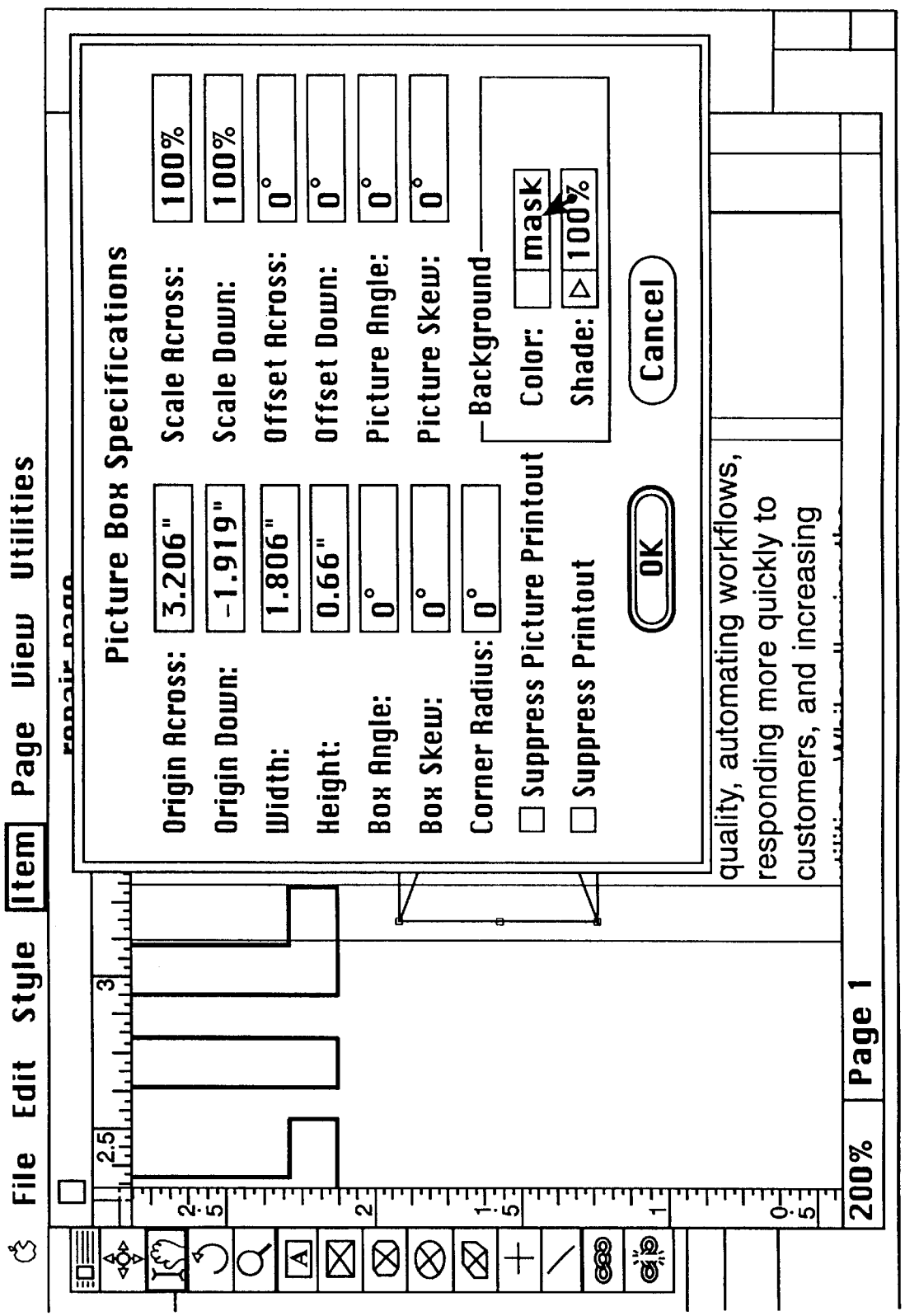
Figure 14E:
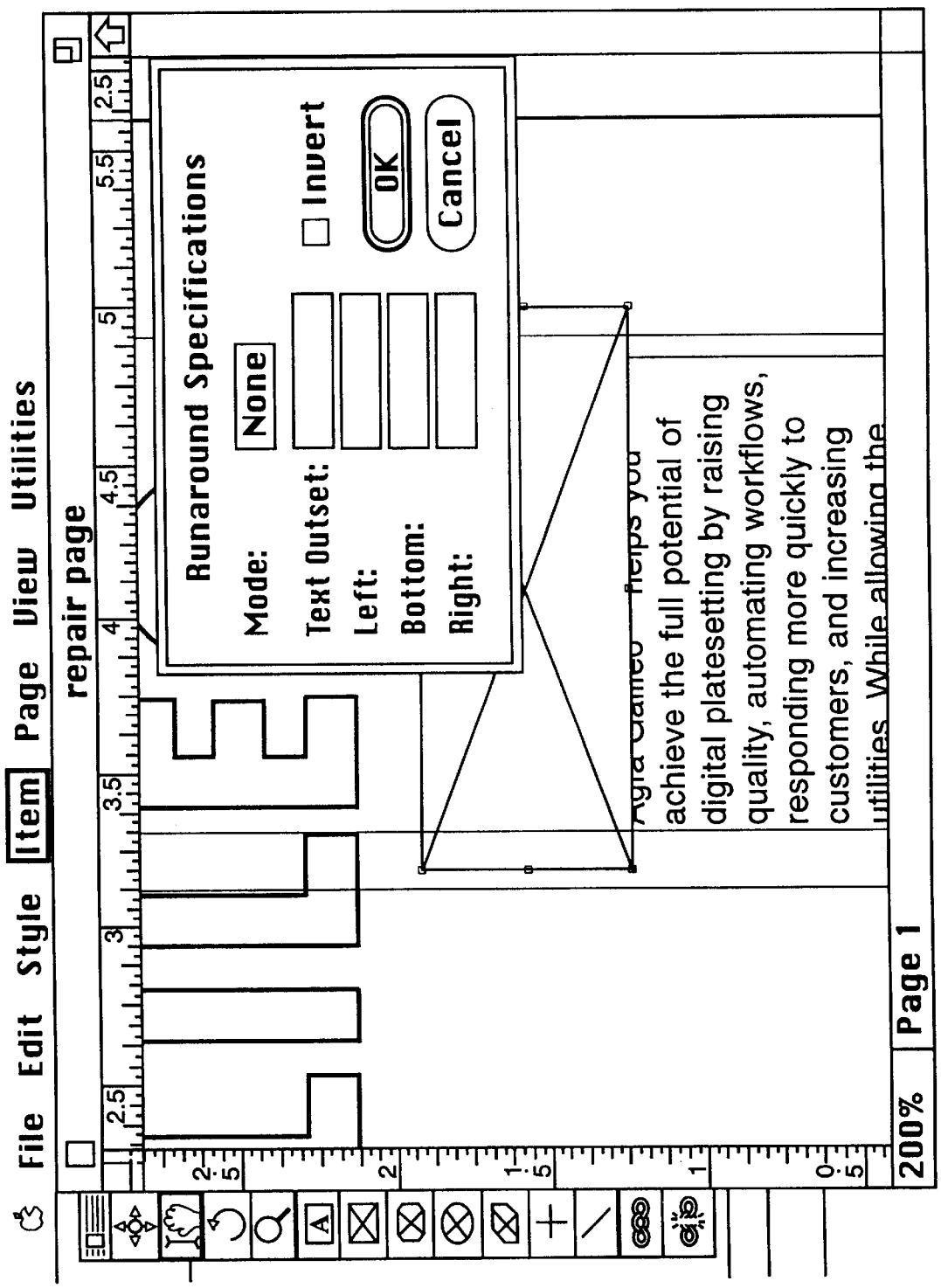

FIGS. 14A–14I illustrate a graphical user interface for the modification of raster data. Referring to FIG. 14A, the modification capability is used to modify the image after the image has been processed by the RIP 34. A new image file, "repair page," is made from the original image. Only the pages with modifications are reprocessed by the RIP 34. The modification raster data is then merged with the original raster data for the flat. In this example, the desired modification is to change the word "Discover" to "Uncover." The change is made in the original application, in this example Quark Express™. Referring to FIG. 14B, the modification to the text has been made, and the word "Discover" has been replaced by the word "Uncover." Referring to FIG. 14C, a new color plane is added to the page being corrected. The name of the color plane is "mask." Referring to FIG. 14D, the Mask color plane contains a solid shape filled with 100% of the non-process spot color "mask." The fill can be less than 100%, but the resulting effect will be less than full modification of the image. Referring to FIG. 14E, the shape is set up using no text runaround and is brought to the front on the page.

This modification image is then saved for placement in the imposition program. The user impositions the page using the same template and setup information as the original job, and places the page in the appropriate position within the imposition. All other positions in the imposition are filled with blank pages. In the imposition program, the mask color is set to print separately and to overprint. The modification flat is then processed by the RIP 34. The only color planes processed by the RIP 34 are the mask and the planes to be replaced. For example, if only black text (with no tint behind it) is to be modified, then only the black plane and the mask need to be processed by the RIP 34. Any color plane that is processed by the RIP 34 can be replaced.

Figure 14F:

Referring to FIG. 14F, the user selects the modification job from the job list 124. In this example, the modification job is "jerry2fix.preps," and the original job is "jerry2.preps." The user selects the modification job from the job list 124, and then drags the modification job onto the original job.

Figure 14G:
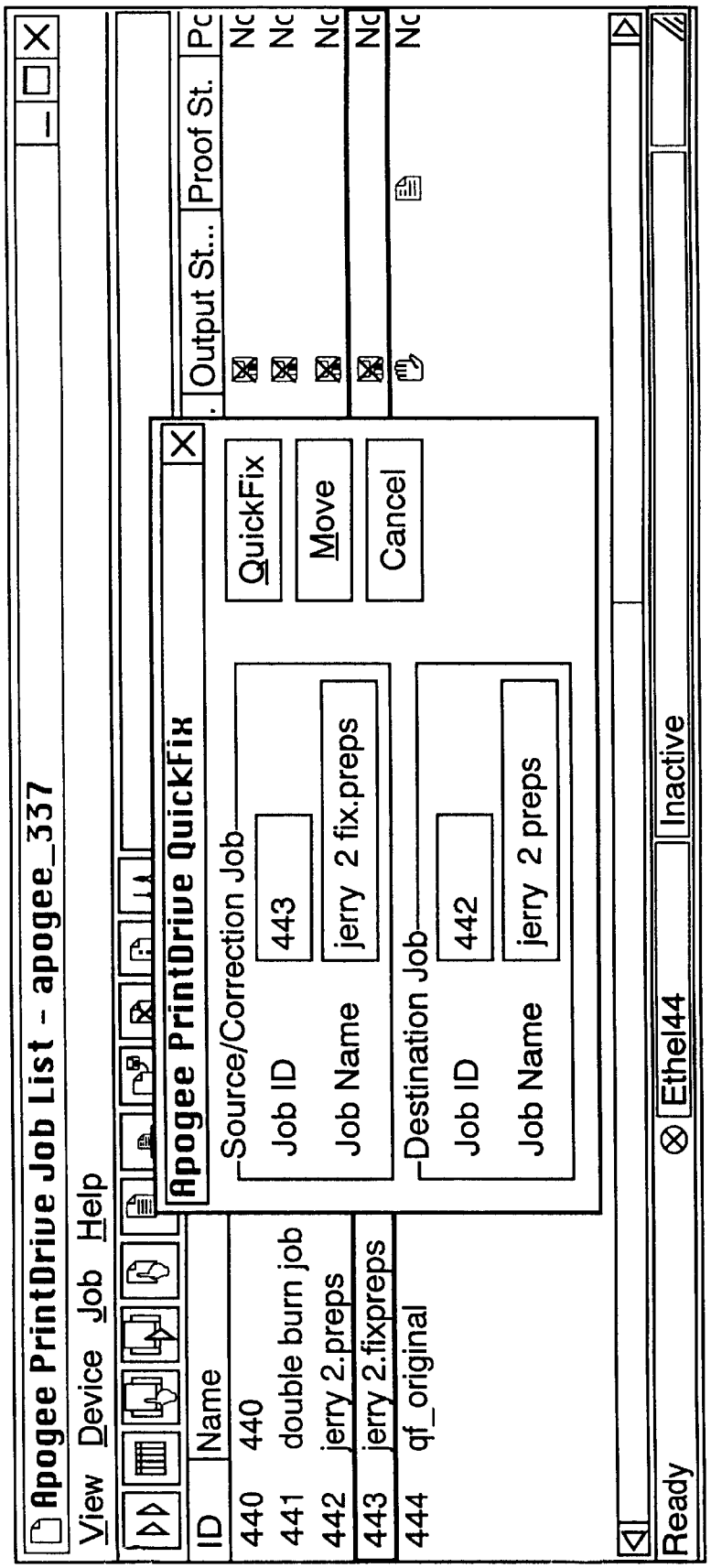

Referring to FIG. 14G, the action of dragging one job on top of another in the job list 124 causes the modification dialog box to appear. As shown in the figure, the dialog box is entitled "QuickFix," which refers to the modification. The action of a modification is confirmed by selecting the "QuickFix" button. If the user had dragged the second job onto the first to move separations from one job to another, the move button would be selected instead. Once the modification has been selected, the print drive software verifies that a mask raster data entitled "mask" exists in the modification job and checks to see which colors have been included in the modification. The mask is then applied to each corresponding color in the original job and the modification data is merged. All activity is posted in the log.

Figure 14H:
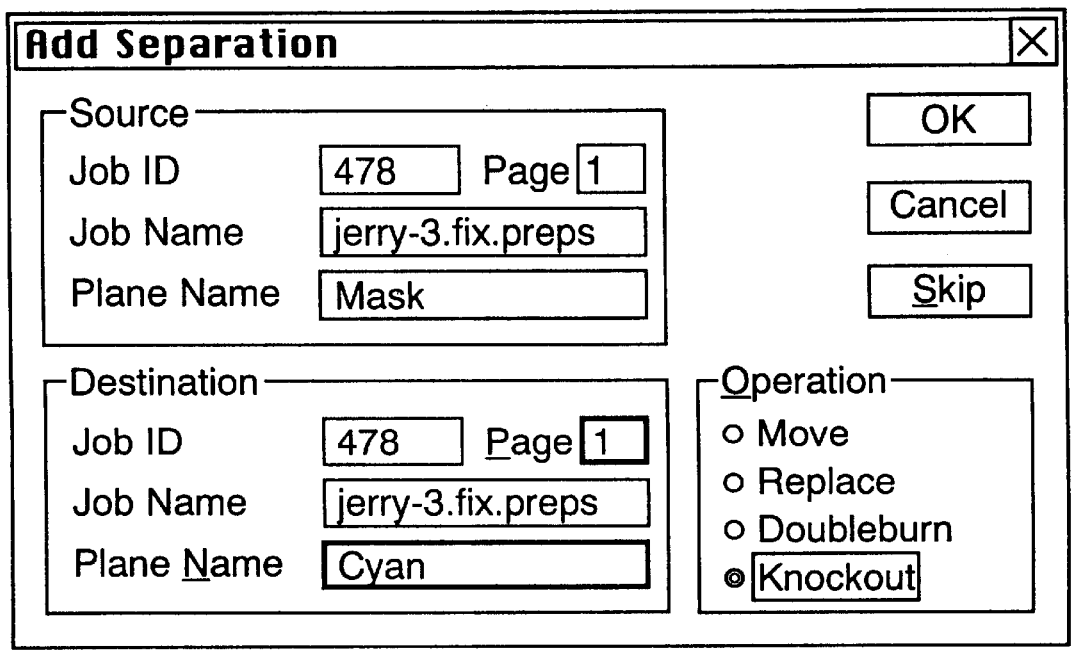

Referring to FIG. 14H, a modification can also be performed by separating the mask operation from the merging of the modification raster data. For example, a mask operation can be initiated by opening each of the jobs in the job list 124, and dragging the mask raster data job on top of the raster data to be masked. The "AddSeparation" dialog box appears. The mask raster data is the source raster data and the Cyan raster data is the destination. The "knockout" selection is used, which initiates the mask operation.

Figure 14I:
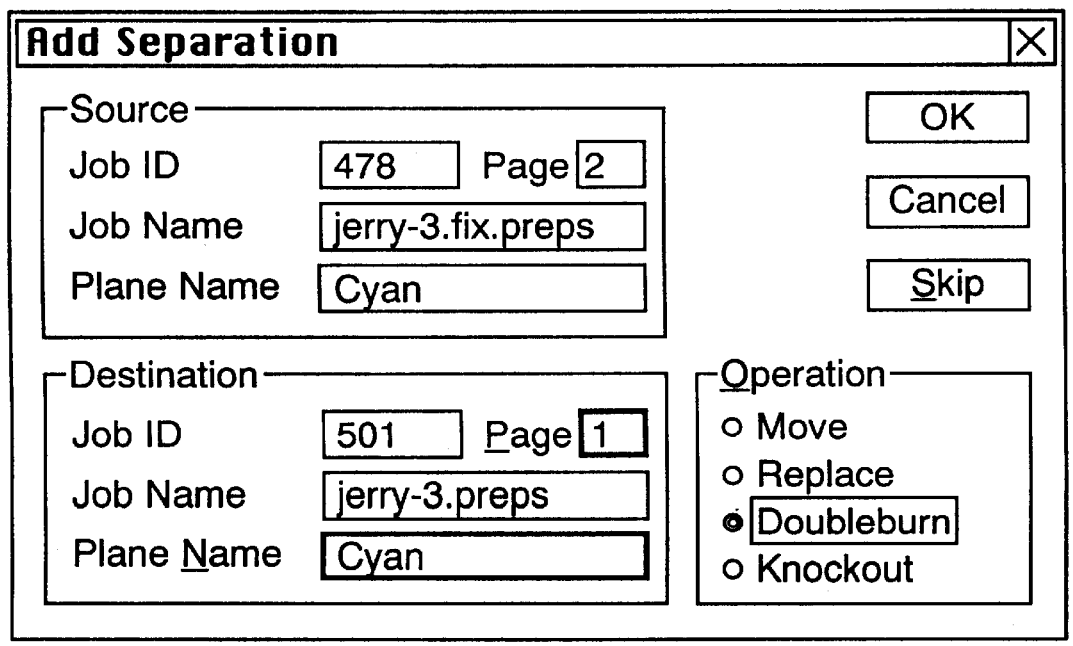

Referring to FIG. 14I, when the modification raster data is ready, the user opens the job information on the job list 124 for the modification raster data and the raster data to be modified. In this example the data to be modified is the Cyan raster data that was just masked. The modification raster data is the source and the masked raster data is the destination. The choice "Doubleburn" is selected from the AddSeparation dialog box. The cyan raster data is replaced by the modified raster data, which is a combination of the modification raster data and the masked raster data. In this manner the user is able to modify the separation.

Both the double burn and the quickfix operations can take place immediately, by reading and writing the altered data to disk, or they can be performed automatically on output. The advantages to performing the operations on output are (1) elimination of the time spent reading and writing data to disk during RIPing, and (2) allowing the user to undo the operation if desired. Configuring a double burn or quickfix operation will cause an immediate update of thumbnail and preview images of the job on the user interface monitor. Performing the double burn or quickfix operations at output result in a significant processing time savings.

One method for performing a double burn operation is to generate two jobs which are used together to perform the double burn. The first job consists of the job content without the text. The intent is to double burn the language text with the job content. The second job contains just the text for the front and back of the sheet in various languages. In the user interface, a double burn is performed by selecting and combining the first and second jobs. Double bum is selected and the thumbnail view and preview will display the desired double burn immediately. The actual double burn operation is performed on the media at output.

A quickfix may be useful, for instance, to make a correction of the black color separation in a group of CMYK separations. A separate job is RIPed containing the corrections for the black color separation and a mask area will be used to make the appropriate corrections. One quickfix method is to select a specific region of the quickfix flat to be used in the double bum. Another quickfix method uses the entire contents of the quickfix flat rather than just the mask area. The user may undo a quickfix or double burn operation via the user interface.

Another improvement to a prepress system as described above is page correction whereby if one page of an 8 up imposition job (i.e. on a prepress machine which handles 8 page flats) needs correction, that page is inserted with 7 blank pages, and sorted through the RIP for significantly less time than if all 8 pages were re-RIPed. The new corrected page replaces the original page using this doubleburn and quickfix technology. Hence, time is saved during RIPing.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. An imaging method for combining first raster data and second raster data, comprising the steps of:
   receiving at a print drive from at least one raster image processor the first raster data of a first image processed by the at least one raster image processor, the print drive comprising a job control system for receiving, storing, digitally combining, and initiating output of raster data, and a user interface for directing operation of the job control system by a system operator;
   receiving the second raster data of a second image processed by the at least one raster image processor;
   facilitating selection of the first raster data and the second raster data via the user interface; and
   digitally combining, upon output to a destination device, in response to direction received via the user interface the first raster data and the second raster data to form combined raster data representing a resultant image.

2. The method of claim 1 wherein the step of digitally combining comprises doubleburning.

3. The method of claim 1 wherein the step of digitally combining comprises masking.

4. The method of claim 1 wherein each of the first image and the second image comprises a color separation or a greyscale separation.

5. The method of claim 1 further comprising the step of rendering the combined raster data to the destination device; the destination device selected from a group consisting of:
   a platesetter for transferring said resultant image onto a printing plate;
   an imagesetter for transferring said resultant image onto a medium;
   a printer for printing said resultant image; and
   a memory for storing said combined raster data.

6. The method of claim 1 further comprising, prior to the step of receiving first raster data, the steps of:
   creating a first image file coded in a page description language;
   receiving, by said at least one raster image processor, the first image file;
   interpreting, by said at least one raster image processor, the first image file to produce the first raster data; and
   transmitting, by said at least one raster image processor, the first raster data; and wherein the method further comprises, prior to the step of receiving second raster data, the steps of:
   creating a second image file coded in said page description language;
   receiving, by said at least one raster image processor, the second image file;
   interpreting, by said at least one raster image processor, the second image file to produce the second raster data; and
   transmitting, by said at least one raster image processor, the second raster data.

7. The method of claim 6 wherein the method further comprises, after creating the first image file, the steps of:
   receiving by a first image server the first image file;
   storing in the first image server the first image file; and
   transmitting by the first image server to said at least one raster image processor the first image file; and wherein the method further comprises, after creating the second image file, the steps of:
   receiving by a second image server the second image file;
   storing in the second image server the second image file; and
   transmitting by the second image server to said at least one raster image processor the second image file.

8. A print drive for controlling operations in a prepress printing system having at least one raster image processor, the print drive comprising:
   a print drive input terminal receiving, from the at least one raster image processor, first raster data of a first image and second raster data of a second image;
   a job control system for receiving, storing, digitally combining, and initiating output of raster data; and
   a user interface for facilitating direction of the print drive job control system by a system operator;

wherein the job control system comprises a digital image combiner electrically coupled to the print drive input terminal, the digital image combiner in response to direction received via the user interface digitally combining, upon output to a destination device, the the first raster data and the second raster data to form combined raster data representing a resultant image.

9. The print drive of claim 8 wherein the digital image combiner comprises a doubleburner.

10. The print drive of claim 8 wherein the digital image combiner comprises a masker.

11. The print drive of claim 8, wherein each of the first image and the second image comprises a color separation or a greyscale separation.

12. The print drive of claim 8, further comprising a print drive output terminal in electrical communication with the digital image combiner, the print drive output terminal capable of transmitting the combined raster data to the destination device selected from a group consisting of:
 a platesetter for transferring said resultant image onto a printing plate;
 an imagesetter for transferring said resultant image onto a medium;
 a printer for printing said resultant image; and
 a memory for storing said combined raster data.

13. The print drive of claim 8 wherein the at least one raster image processor comprises a page description language interpreter.

14. The print drive system of claim 8 wherein the second raster data has substantially the same resolution as the first raster data.

15. The print drive of claim 8 wherein the prepress printing system, in electrical communication with the print drive input terminal, comprises: a general purpose computer having imaging software for producing both a first image file and a second image file coded in a page description language; and wherein the at least one raster image processor, in electrical communication with the general purpose computer, receives and converts the first image file and the second image file, respectively, to said first raster data and second raster data.

16. The print drive of claim 15 wherein the prepress printing system further comprises an image server in electrical communication with the general purpose computer and the last least one raster image processor, the image server comprising:
 an image server receiver for receiving from the general purpose computer the first image file and the second image file;
 an image server data store in electrical communication with the image server receiver, the image server data store storing the first image file and the second image file; and an image server transmitter, in electrical communication with the image server data store, for transmitting to said at least one raster image processor the first image file and the second image file.

17. An imaging system for digital combining, comprising:
 an image acquisition device for acquiring a first image and a second image;
 at least one raster image processor, in electrical communication with the image acquisition device, for processing the first image to create first raster data and for processing the second image to create second raster data; and
 a print drive, comprising:
  a print drive input terminal receiving, from the at least one raster image processor, first raster data of a first image and second raster data of a second image;
  a job control system for receiving, storing, digitally combining, and initiating output of raster data;
  a user interface for facilitating direction of the print drive job control system by a system operator;
  wherein the job control system comprises a digital image combiner in communication with the print drive input terminal, the digital image combiner in response to direction received via the user interface digitally combining, upon output to a destination device, the first raster data and the second raster data to form combined raster data representing a resultant image.

18. The imaging system of claim 17, further comprising the destination device in electrical communication with the print drive and selected from a group consisting of:
 a platesetter for transferring said resultant image onto a printing plate;
 an imagesetter for transferring said resultant image onto a medium;
 a printer for printing said resultant image; and
 a memory for storing said combined raster data.

19. A method for imaging, comprising:
 receiving first raster data of a first image processed by at least one raster image processor;
 receiving second raster data of a second image processed by said at least one raster image processor representing a modification to the first image;
 receiving mask raster data of the second image processed by said at least one raster mage processor representing a mask of the modification to the first image;
 digitally masking the first raster data with the mask raster data to form masked first raster data; and
 digitally combining, upon output to a destination device, the masked first raster data and the second raster data to form modified raster data representing a resultant image.

20. The method of claim 19 wherein said at least one raster image processor comprises a page description language interpreter.

21. The method of claim 19 wherein the second rater data has substantially the same resolution as the first raster data.

22. The method of claim 19 wherein each of the first image and the second image comprises a color separation or a greyscale separation.

23. The method of claim 19 further comprising the step of rendering the modified raster data to the destination device selected from a group consisting of:
 a platesetter for transferring said resultant image onto a printing plate;
 an imagesetter for transferring said resultant image onto a medium;
 a printer for printing said resultant image; and
 a memory for storing said combined raster data.

24. The imaging method of claim 1 further comprising, after the step of digitally combining the first raster data and the second raster data to form combined raster data representing a resultant image, the steps of generating a preview image of the resultant image and displaying the preview image.

25. The method of claim 6 wherein the first image comprises a content of the resultant image without a text component and wherein the step of creating a second image file comprises selecting, from a third image file, the text component of the content of the resultant image in at least one language; the third image file comprising the text component of the content of the resultant image in at least two languages.

26. The method of claim 19 further comprising, prior to the step of receiving first raster data, the steps of:
creating a first image file coded in a page description language;
receiving, by said at least one raster image processor, the first image file;
interpreting, by said at least one raster image processor, the first image file to produce the first raster data; and
transmitting, by said at least one raster image processor, the first raster data; and wherein the method further comprises, prior to the step of receiving second raster data, the steps of:
creating a second image file coded in said page description language;
receiving, by said at least one raster image processor, the second image file;
interpreting, by said at least one raster image processor, the second image file to produce the second raster data; and
transmitting, by said at least one raster image processor, the second raster data.

27. The method of claim 26 wherein the method further comprises, after creating the first image file, the steps of:
receiving by a first image server the first image file;
storing in the first image server the first image file; and
transmitting by the first image server to said at least one raster image processor the first image file;
and wherein the method further comprises, after creating the second image file, the steps of:
receiving by a second image server the second image file;
storing in the second image server the second image file; and
transmitting by the second image server to said at least one raster image processor the second image file.

28. The imaging method of claim 19, further comprising, after the step of digitally combining the masked first raster data and the second raster data to form modified raster data representing a resultant image, the steps of generating a preview image of the resultant image and displaying the preview image.

29. The imaging method of claim 19 wherein the first image comprises a color separation from a plurality of color separations.

30. The imaging method of claim 19 wherein
the first image comprises a first multi-page imposition layout; and
the second image comprises a second multi-page imposition layout; the second multi-page imposition layout comprising:
a modification to at least one page of the first multi-page imposition layout, and
a plurality of blank pages; the number of blank pages being equal to the number of non-modified pages in the first multi-page imposition layout.

* * * * *